US012243497B2

(12) United States Patent
Liu et al.

(10) Patent No.: US 12,243,497 B2
(45) Date of Patent: Mar. 4, 2025

(54) DISPLAY MODULE AND DRIVING METHOD THEREOF, AND DISPLAY DEVICE

(71) Applicant: Xiamen Tianma Micro-Electronics Co., Ltd., Xiamen (CN)

(72) Inventors: Jian Liu, Xiamen (CN); Liu Wang, Xiamen (CN); Zhijie Wang, Xiamen (CN); Shumao Wu, Xiamen (CN); Wei Wu, Xiamen (CN); Guochang Lai, Xiamen (CN)

(73) Assignee: Xiamen Tianma Micro-Electronics Co., Ltd., Xiamen (CN)

( * ) Notice: Subject to any disclaimer, the term of this patent is extended or adjusted under 35 U.S.C. 154(b) by 0 days.

(21) Appl. No.: 18/119,078

(22) Filed: Mar. 8, 2023

(65) Prior Publication Data

US 2024/0203370 A1 Jun. 20, 2024

(30) Foreign Application Priority Data

Dec. 19, 2022 (CN) ......................... 202211634144.3

(51) Int. Cl.
*G09G 3/34* (2006.01)
*G09G 3/32* (2016.01)

(52) U.S. Cl.
CPC ............. *G09G 3/3426* (2013.01); *G09G 3/32* (2013.01); *G09G 2310/0267* (2013.01); *G09G 2310/0275* (2013.01); *G09G 2310/0286* (2013.01); *G09G 2320/0257* (2013.01); *G09G 2330/021* (2013.01)

(58) Field of Classification Search
CPC ................... G09G 3/3426; G09G 3/32; G09G 2310/0267; G09G 2310/0275; G09G 2310/0286; G09G 2320/0257; G09G 2330/021; G09G 3/342
See application file for complete search history.

(56) References Cited

U.S. PATENT DOCUMENTS 8,456,413 B2 * 6/2013 Furukawa ............ G09G 3/3688 345/88
8,564,528 B1 * 10/2013 Chen .................... G09G 3/3611 345/102

(Continued)

FOREIGN PATENT DOCUMENTS

CN 107123388 A 9/2017

*Primary Examiner* — Jose R Soto Lopez
(74) *Attorney, Agent, or Firm* — Anova Law Group, PLLC

(57) ABSTRACT

A display module and a driving method thereof, and a display device are provided. The display module includes a backlight structure including a plurality of backlight partitions. The display module includes a first display mode and a second display mode. Resolution of the display module in the first display mode is greater than the resolution of the display module in the second display mode. In the first display mode, a quantity of the plurality of backlight partitions of the backlight structure is n1, and an area of one of the plurality of backlight partitions of the backlight structure is S1. In the second display mode, the quantity of the plurality of backlight partitions of the backlight structure is n2, and the area of one of the plurality of backlight partitions of the backlight structure is S2, with n1>n2, and S1<S2.

18 Claims, 22 Drawing Sheets

(56) References Cited

U.S. PATENT DOCUMENTS 8,687,840 B2 * 4/2014 Samanta Singhar . G06F 1/3231 382/117
8,766,904 B2 * 7/2014 Neal .................... G09G 3/3426 345/102
9,564,086 B2 * 2/2017 Ye ............................ G09G 3/20
10,591,769 B2 * 3/2020 Harada ................ G09G 3/3406
2002/0113808 A1 * 8/2002 Weindorf ............. G09G 3/3406 345/699
2003/0043097 A1 * 3/2003 Shingai ................ G09G 3/3666 345/87
2008/0094344 A1 * 4/2008 Kuroki ................... G09G 3/342 345/102
2008/0231577 A1 * 9/2008 Lin ...................... G09G 3/3607 345/102
2008/0238859 A1 * 10/2008 Kim ....................... G09G 3/342 345/102
2008/0284719 A1 * 11/2008 Yoshida ................ G02F 1/1368 349/37
2009/0128543 A1 * 5/2009 Sarma .................. G09G 3/3426 345/214
2009/0179848 A1 * 7/2009 Schmidt ............... G09G 3/2081 348/739
2009/0303170 A1 * 12/2009 Chung ................. G09G 3/3426 345/102
2010/0103089 A1 * 4/2010 Yoshida ............... G09G 3/3426 345/102
2010/0110112 A1 * 5/2010 Nakanishi ............ G09G 3/3426 345/690
2010/0194791 A1 * 8/2010 Ogi ...................... G09G 3/3426 345/691
2010/0295767 A1 * 11/2010 Lee ...................... G09G 3/3426 345/102
2011/0037784 A1 * 2/2011 Shiomi ................ G09G 3/3426 345/102
2011/0037785 A1 * 2/2011 Shiomi ................ G09G 3/3426 345/102
2011/0069078 A1 * 3/2011 Zhang ................... G06F 1/3221 345/589
2011/0193895 A1 * 8/2011 Johnson ............... G09G 3/3426 345/690
2011/0216250 A1 * 9/2011 Sim ...................... G09G 3/3426 348/E5.135
2011/0254873 A1 * 10/2011 Asano .................. G09G 3/3413 345/90
2011/0291919 A1 * 12/2011 Kerofsky ............. G09G 3/2055 345/102
2011/0298839 A1 * 12/2011 Nakanishi ............ G09G 3/3426 345/690
2011/0316902 A1 * 12/2011 Onishi ................. G09G 3/3611 345/102
2012/0056912 A1 * 3/2012 Adachi .................. H05B 45/54 315/122
2012/0113164 A1 * 5/2012 Furukawa ............ G09G 3/3648 345/102
2012/0133686 A1 * 5/2012 Adachi ................. G02F 1/1335 345/690
2012/0139968 A1 * 6/2012 Adachi .................. H05B 45/20 315/250
2012/0274669 A1 * 11/2012 Neal ...................... G09G 3/342 345/102
2012/0281028 A1 * 11/2012 Orlick .................. G09G 3/3426 345/102
2012/0287143 A1 * 11/2012 Brown Elliott ...... G09G 3/3413 345/589
2012/0287147 A1 * 11/2012 Brown Elliott .......... G09G 5/02 345/593
2012/0306943 A1 * 12/2012 Messmer ............. G09G 3/3426 345/690
2013/0050293 A1 * 2/2013 Feng ................. G02F 1/133603 345/87
2013/0093802 A1 * 4/2013 Tanaka ..................... G09G 5/10 345/690
2013/0155125 A1 * 6/2013 Inamura ............... G09G 3/3426 345/102
2013/0234922 A1 * 9/2013 Tatsumi ............... G09G 3/3406 345/102
2013/0271959 A1 * 10/2013 Woodgate ................. F21K 9/00 362/97.1
2013/0314453 A1 * 11/2013 Ko ........................... G09G 5/10 345/102
2014/0078720 A1 * 3/2014 An .................... G02F 1/133603 362/97.1
2014/0132891 A1 * 5/2014 Tohyama ............. H05K 1/0204 315/297
2014/0253609 A1 * 9/2014 Wan ......................... G09G 3/32 345/83
2015/0023424 A1 * 1/2015 Lim ....................... H04N 19/53 375/240.16
2015/0206480 A1 * 7/2015 Foo ...................... G09G 3/3406 345/102
2015/0348469 A1 * 12/2015 Otoi ......................... G09G 3/36 345/102
2015/0365621 A1 * 12/2015 Zhang .................. H04N 5/7408 348/791
2016/0293114 A1 * 10/2016 Hayashi ............... G09G 3/3406
2017/0061896 A1 * 3/2017 Zhang .................. G09G 3/3426
2017/0061897 A1 * 3/2017 Zhang .................. G09G 3/3426
2017/0084232 A1 * 3/2017 Yang .................... G09G 3/3426
2017/0110064 A1 * 4/2017 Zhang .................. G09G 3/3406
2017/0110065 A1 * 4/2017 Zhang .................. G09G 3/3426
2017/0339417 A1 * 11/2017 Puri .................... G06F 18/2178
2018/0182306 A1 * 6/2018 Seong ...................... G09G 3/36
2018/0366084 A1 * 12/2018 Bedi ........................ G09G 5/00
2019/0228712 A1 * 7/2019 Li ........................ G09G 3/3266
2019/0348001 A1 * 11/2019 Shi ........................... G09G 3/32
2020/0184905 A1 * 6/2020 Park ....................... G09G 3/342
2020/0320940 A1 * 10/2020 Lee ...................... G09G 3/3426
2021/0020114 A1 * 1/2021 Lee ........................ G09G 3/342
2021/0035506 A1 * 2/2021 Cong ..................... G09G 3/342
2021/0065621 A1 * 3/2021 Lee ...................... G09G 3/3208
2021/0082355 A1 * 3/2021 Zha .......................... G09G 3/36
2021/0225303 A1 * 7/2021 Shi ....................... G09G 3/3406
2021/0304689 A1 * 9/2021 Nam .................... G09G 3/3426
2021/0343253 A1 * 11/2021 Goto ...................... G02F 1/133
2021/0366410 A1 * 11/2021 Cho .................. G02F 1/134363
2022/0155638 A1 * 5/2022 Weindorf ............... G02B 30/31
2022/0319443 A1 * 10/2022 Hiramatsu ........... G09G 3/3413
2022/0392414 A1 * 12/2022 Roever ..................... G06T 1/20
2023/0185511 A1 * 6/2023 Liu ........................... G06T 3/40 345/545
2023/0230527 A1 * 7/2023 Chung ................... G09G 3/342 345/699
2023/0230559 A1 * 7/2023 Friedman ............... G09G 5/008 345/204

* cited by examiner

DISPLAY MODULE AND DRIVING METHOD THEREOF, AND DISPLAY DEVICE

CROSS-REFERENCE TO RELATED APPLICATION

This application claims priority of Chinese Patent Application No. 202211634144.3, filed on Dec. 19, 2022, the entire content of which is hereby incorporated by reference.

FIELD OF THE DISCLOSURE

The present disclosure generally relates to the field of display technology and, more particularly, relates to a display module, a driving method thereof, and a display device.

BACKGROUND

In existing technologies, a display module may include a display panel and a backlight module. Brightness of the backlight module may be adjusted by a local dimming technology. The backlight module may be divided into a plurality of backlight partitions, and backlight brightness of each backlight partition may be adjusted separately. When the display module displays a high-resolution picture, and when an area of each backlight partition in the backlight module is large, due to lighting of the backlight partition with a large area, light sources may exist at the edge of the picture that do not need light sources. Since this part of the light source may have a large area, halos may appear at the edge of the picture displayed. That is, dimming effects of the local dimming technology may not be ideal at the position of the backlight module corresponding to the edge of the picture displayed. Tuning of the corresponding display fineness may be difficult, and unfavorable display effects, such as halos at corners of the picture, may appear.

SUMMARY

One aspect of the present disclosure includes a display module. The display module includes a backlight structure including a plurality of backlight partitions. The display module includes a first display mode and a second display mode. Resolution of the display module in the first display mode is greater than the resolution of the display module in the second display mode. In the first display mode, a quantity of the plurality of backlight partitions of the backlight structure is n1, and an area of one of the plurality of backlight partitions of the backlight structure is S1. In the second display mode, the quantity of the plurality of backlight partitions of the backlight structure is n2, and the area of one of the plurality of backlight partitions of the backlight structure is S2, with n1>n2, and S1<S2.

Another aspect of the present disclosure includes a driving method for a display module. The display module includes a backlight structure including a plurality of backlight partitions, the display module includes a first display mode and a second display mode, and resolution of the display module in the first display mode is greater than the resolution of the display module in the second display mode. The driving method includes, in the first display mode, adjusting the backlight partitions of the backlight structure, such that a quantity of the backlight partitions of the backlight structure is n1, and an area of one of the backlight partitions of the backlight structure is S1. The driving method also includes, in the second display mode, adjusting the backlight partitions of the backlight structure, such that the backlight partitions of the backlight structure is n2, and the area of one of the backlight partitions of the backlight structure is S2, with n1>n2, and S1<S2.

Another aspect of the present disclosure includes a display device. The display device includes a display module. The display module includes a backlight structure including a plurality of backlight partitions. The display module includes a first display mode and a second display mode. Resolution of the display module in the first display mode is greater than the resolution of the display module in the second display mode. In the first display mode, a quantity of the plurality of backlight partitions of the backlight structure is n1, and an area of one of the plurality of backlight partitions of the backlight structure is S1. In the second display mode, the quantity of the plurality of backlight partitions of the backlight structure is n2, and the area of one of the plurality of backlight partitions of the backlight structure is S2, with n1>n2, and S1<S2.

Other aspects of the present disclosure may be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Figure 1:
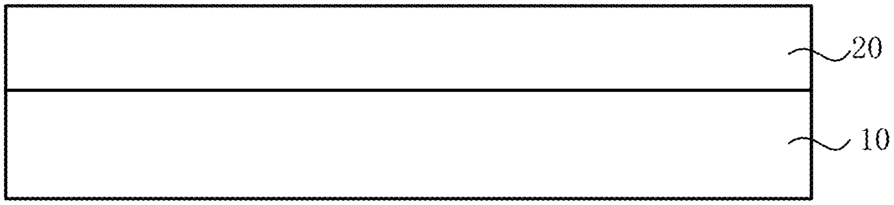
FIG. 1 illustrates a schematic structural diagram of a display module consistent with the disclosed embodiments of the present disclosure.

To make the objectives, technical solutions and advantages of the present disclosure clearer and more explicit, the present disclosure is described in further detail with accompanying drawings and embodiments. It should be understood that the specific exemplary embodiments described herein are only for explaining the present disclosure and are not intended to limit the present disclosure.

Technologies, methods, and equipment known to those of ordinary skill in relevant fields may not be discussed in detail, but where appropriate, these technologies, methods, and equipment should be regarded as part of the specification.

In the present disclosure, any specific values should be construed as exemplary only, and not as limitations. Different embodiments may have different values.

Reference will now be made in detail to embodiments of the present disclosure, which are illustrated in the accompanying drawings. Similar labels and letters designate similar items in the drawings. Once an item is defined in one drawing, the item may not be defined and discussed in subsequent drawings.

Figure 2:
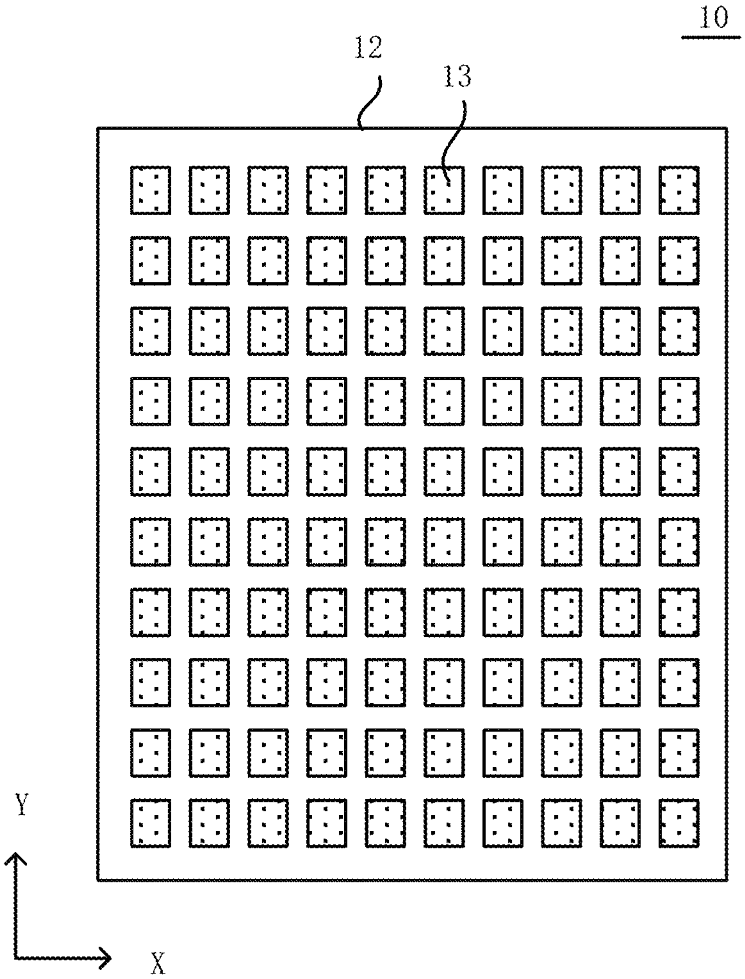
FIG. 2 illustrates a schematic plan view of a backlight structure consistent with the disclosed embodiments of the present disclosure.
Figure 3:
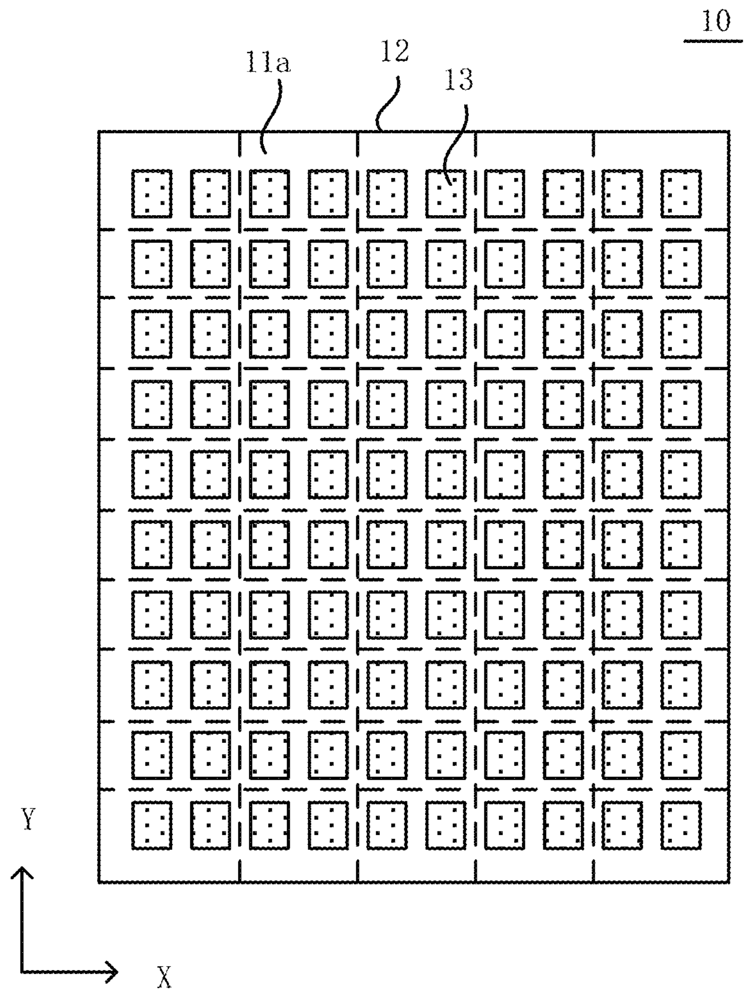
FIG. 3 illustrates a schematic partition diagram of the backlight structure in a first display mode, consistent with the disclosed embodiments of the present disclosure.
Figure 4:
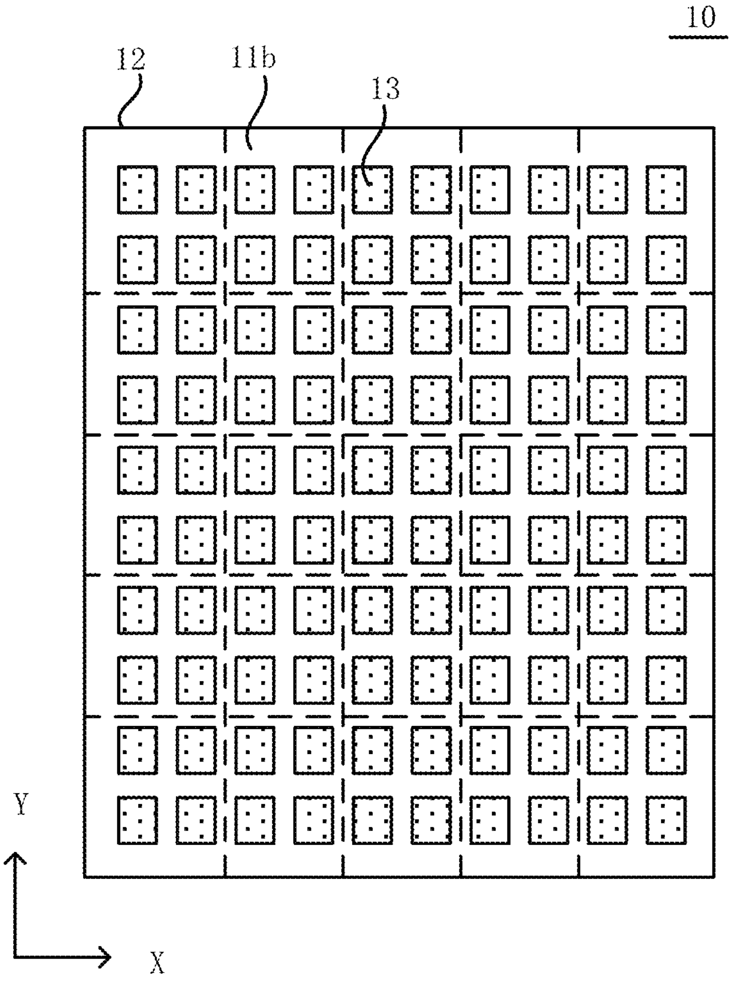
FIG. 4 illustrates a schematic partition diagram of the backlight structure in a second display mode, consistent with the disclosed embodiments of the present disclosure.

FIG. 1 illustrates a schematic structural diagram of a display module consistent with the disclosed embodiments of the present disclosure. FIG. 2 illustrates a schematic plan view of a backlight structure consistent with the disclosed embodiments of the present disclosure. FIG. 3 illustrates a schematic partition diagram of the backlight structure in a first display mode. FIG. 4 illustrates a schematic partition diagram of the backlight structure in a second display mode. With reference to FIGS. 1-4, the present disclosure provides a display module. The display module includes a backlight structure 10. The display module also includes a display panel 20, and the backlight structure 10 is arranged opposite to the display panel 20. The display panel 20 is located on a light-exiting surface of the backlight structure 10, and the backlight structure 10 provides a light source for the display panel 20. The backlight structure 10 may include a plurality of backlight partitions 11. That is, the backlight structure 10 may be divided into a plurality of backlight partitions 11.

The display module may include a first display mode and a second display mode. Resolution of the display module in the first display mode is greater than resolution of the display module in the second display mode. That is, in the first display mode, the display module may display a high-resolution picture, and in the second display mode, the display module may display a low-resolution picture.

In the first display mode, the quantity of backlight partitions 11*a* of the backlight structure 10 is n1, and the area of each backlight partition 11*a* of the backlight structure 10 is S1. In the second display mode, the quantity of backlight partitions 11*b* of the backlight structure 10 is n2, and the area of each backlight partition 11*b* of the backlight structure 10 is S2, with $n1>n2$, $S1<S2$. That is, the quantity of backlight partitions 11*a* in the backlight structure 10 in the first display mode is greater than the quantity of backlight partitions 11*b* in the backlight structure 10 in the second display mode. Accordingly, the area of each backlight partition 11*a* in the first display mode is smaller than the area of each backlight partition 11*a* in the second display mode.

Specifically, in the present disclosure, the area of the backlight partition 11 in the backlight structure 10 may be adjusted according to the display mode of the display module. When the display module displays a high-resolution picture, the backlight structure 10 may be divided into more backlight partitions 11, and thus the area of each backlight partition 11 in the backlight structure 10 may be reduced. Accordingly, at the edge of the picture displayed by the display module, the area of the backlight partition 11 may be relatively small. As such, at the edge of the picture displayed, even if a light source may exist at the part that does not need to a light source, the area of the part of the light source may be small. Thus, the halos at the edge of the picture displayed may be reduced, and may even be negligible. Accordingly, the difficulty of adjusting the fineness of high-resolution pictures may be decreased, problems such as halos on the edges of pictures displayed may be reduced, and display effects may thus be improved.

It should be noted that, FIG. 3 exemplarily shows that the backlight structure 10 includes 5×10 backlight partitions 11 in the first display mode, and FIG. 4 exemplarily shows that the backlight structure 10 includes 5×5 backlight partitions 11 in the second display mode. The number, shape and size of the backlight partitions 11 shown in FIG. 3 and FIG. 4 are only schematic illustrations, and do not represent the actual number, shape and size.

FIGS. 3 and 4 exemplarily show that the display module may include a first display mode and a second display mode. In some other embodiments of the present disclosure, the display module may also include other display modes. The area of the backlight partitions 11 in the backlight structure 10 may be adjusted according to the display mode of the display module. When the display module displays a high-resolution picture, the area of each backlight partition 11 in the backlight structure 10 may be reduced. When the display module displays a low-resolution picture, the area of each backlight partition 11 in the backlight structure 10 may be increased.

It should be noted that, FIG. 1 only shows a relative positional relationship between the backlight structure 10 and the display panel 20. FIG. 1 does not illustrate film structures and sizes of the film structures that may be included in the backlight structure 10 and the display panel 20.

With continuous reference to FIGS. 1-4, in some embodiments, the backlight structure 10 may include a substrate 12 and a plurality of light-emitting units 13 located on one side of the substrate 12. Optionally, the light-emitting unit 13 may be a mini light-emitting diode (mini-LED). When the mini-LED is used as a surface light source in the backlight structure 10, the backlight structure 10 may not need structures such as light guide plates and reflectors. Accordingly, the thickness of the backlight structure 10 may be reduced.

It should be noted that, in some other embodiments, the light-emitting unit 13 may also be an LED or a Micro-LED. The present disclosure will not go into details here.

In the first display mode, the quantity of the light-emitting units 13 in one backlight partition 11*a* is N1. In the second display mode, the quantity of the light-emitting units 13 in one backlight partition 11*b* is N2, with N1<N2. Exemplarily, referring to FIG. 3, in the first display mode, the quantity of the light-emitting units 13 in the backlight partition 11*a* of the backlight structure 10 is 2×1. Referring to FIG. 4, in the second display mode, the quantity of the light-emitting units 13 in the backlight partition 11*b* of the backlight structure 10 is 2×2. That is, the quantity of the light-emitting units 13 in the backlight partition 11*a* of the backlight structure 10 in the first display mode is smaller than the quantity of the light-emitting units 13 in the backlight partition 11*b* of the backlight structure 10 in the second display mode. Accordingly, the area of each backlight partition 11*a* in the first display mode is smaller than the area of each backlight partition 11*b* in the second display mode.

Specifically, in the display module provided by the present disclosure, the area of the backlight partition 11 in the backlight structure 10 may be adjusted according to the display mode of the display module. When the display module displays a high-resolution picture, the quantity of the light-emitting units 13 in each backlight partition 11 in the backlight structure 10 may be reduced. Accordingly, the area of each backlight partition 11 in the backlight structure 10 may be decreased. As such, the difficulty of adjusting the fineness of the high-resolution picture may be reduced, problems such as halos at the edge of the picture displayed may be alleviated, and the display effect may thus be improved.

It should be noted that FIGS. 2-4 exemplarily show that the backlight structure 10 includes 10×10 light-emitting units 13. The number, shape and size of the light-emitting units 13 in the backlight structure 10 shown in FIGS. 2-4 are only schematic illustrations, and do not represent the actual number, shape and size. FIG. 3 exemplarily shows that, in the first display mode, the quantity of the light-emitting units 13 in the backlight partition 11*a* is 2×1. FIG. 4 exemplarily shows that, in the second display mode, the quantity of the light-emitting units 13 in the backlight sub-region 11*b* is 2×2. In some other embodiments, in the first display mode and the second display mode, other numbers of light-emitting units 13 may also be set in the backlight partition 11. The display module may also include other display modes. The quantity of the light-emitting units 13 in the backlight partition 11 in the backlight structure 10 may be adjusted according to the display mode of the display module. When the display module displays a high-resolution picture, the area of each backlight partition 11 in the backlight structure 10 may be decreased. When the display module displays a low-resolution picture, the area of each backlight partition 11 in the backlight structure 10 may be increased.

Figure 5:
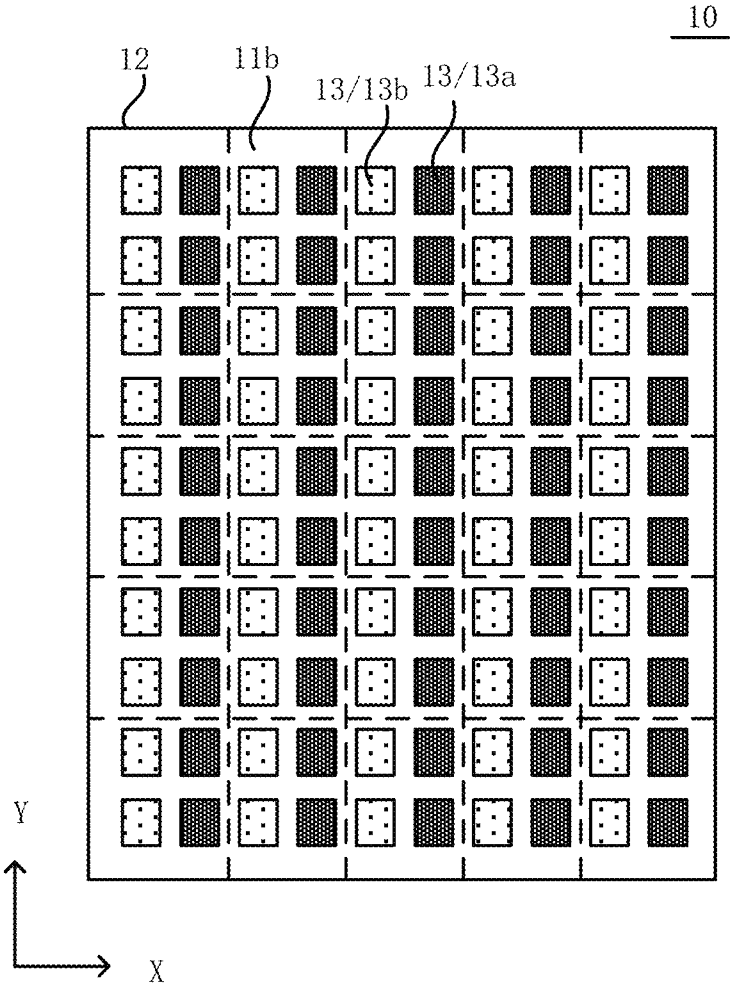
FIG. 5 illustrates a lighting diagram of the backlight structure in a second display mode, consistent with the disclosed embodiments of the present disclosure.

In some embodiments, in the second display mode, some light-emitting units in the backlight partition may not emit light. FIG. 5 illustrates a lighting diagram of the backlight structure in a second display mode. With reference to FIG. 5, in the second display mode, when the backlight partition 11*b* in the backlight structure 10 needs to provide a light source, the light-emitting units 13*a* may be used to emit light, and the light-emitting units 13*b* may not be used to emit light.

Specifically, in one embodiment, the area of the backlight partition 11 in the backlight structure 10 may be adjusted according to the display mode of the display module. When the display module displays a high-resolution picture, the quantity of the light-emitting units 13 in each backlight partition 11 in the backlight structure 10 may be reduced, and the area of each backlight partition 11 in the backlight structure 10 may thus be reduced. Accordingly, the difficulty of adjusting the fineness of the high-resolution picture may be reduced, problems such as halos at the edge of the picture displayed may be alleviated, and the display effect may thus be improved. In addition, in the second display mode, the display module displays a low-resolution picture. When the backlight partition 11*b* in the backlight structure 10 needs to provide a light source, some light-emitting units 13 in the backlight partition 11*b* may not emit light. As such, while meeting the resolution requirement of the display screen of the display module, power consumption may be reduced, and device consumption may also be reduced.

It should be noted that, FIG. 5 exemplarily shows a distribution diagram of the light-emitting units 13*a* used for emitting light and the light-emitting units 13*b* not used for emitting light in each backlight partition 11 in the backlight structure 10 in the second display mode. In some other embodiments, in the second display mode, the number and distribution of the light-emitting units 13*a* used for emitting light and the light-emitting units 13*b* not used for emitting light in each backlight partition 11 of the backlight structure 10 may be set according to actual needs.

Figure 6:
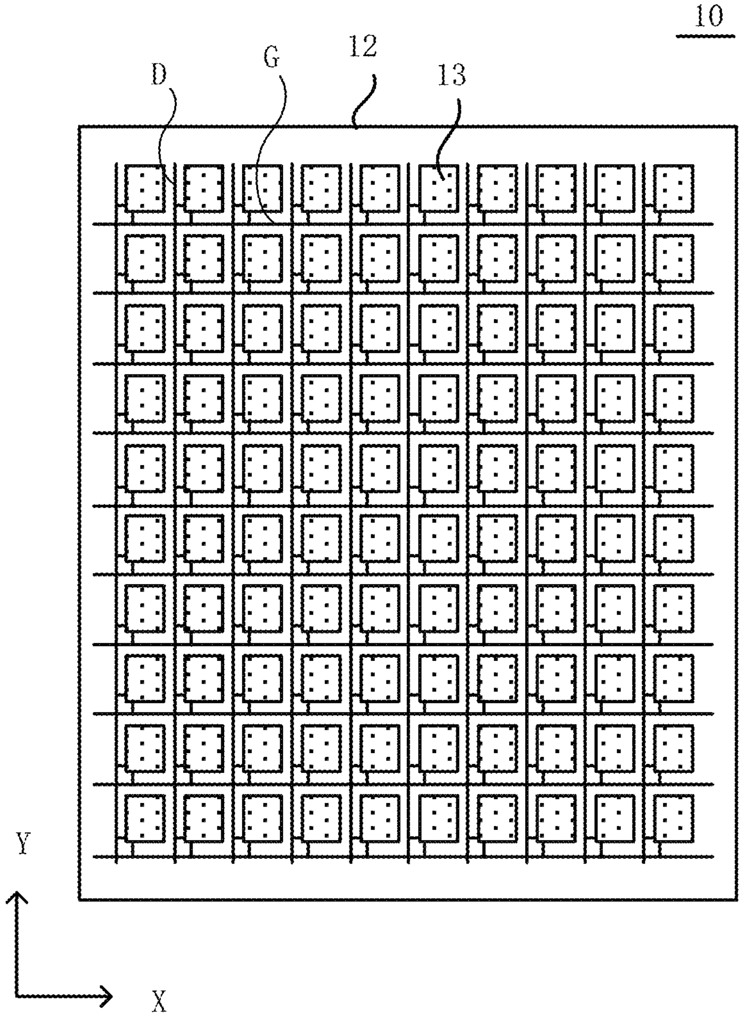
FIG. 6 illustrates a schematic structural diagram of the backlight structure consistent with the disclosed embodiments of the present disclosure.

FIG. 6 illustrates a structural schematic diagram of the backlight structure consistent with the disclosed embodiments of the present disclosure. With reference to FIGS. 3, 4, and 6, in some embodiments, the plurality of light-emitting units 13 may be arranged in an array along a first direction X and a second direction Y. The first direction X and the second direction Y intersect. Optionally, the first direction X and the second direction Y are perpendicular to each other.

The backlight structure 10 may further include a plurality of scan lines G extending along the first direction X and a plurality of data lines D extending along the second direction Y. The light-emitting units 13 arranged along the first direction X are electrically connected to a same scan line G. That is, an entire row of light-emitting units 13 arranged along the first direction X is electrically connected to a same scan line G. The light-emitting units 13 arranged along the second direction Y are electrically connected to a same data line D. That is, the entire column of light-emitting units 13 arranged along the second direction Y is electrically connected to a same data line D.

The data lines D may be used to transmit signals to adjust the quantity of the light-emitting units 13 in each backlight partition 11 in the first display mode and in the second display mode. The scan lines G may be used to transmit signals to adjust the quantity of the light-emitting units 13 in each backlight partition 11 in the first display mode and in the second display mode.

Figure 7:
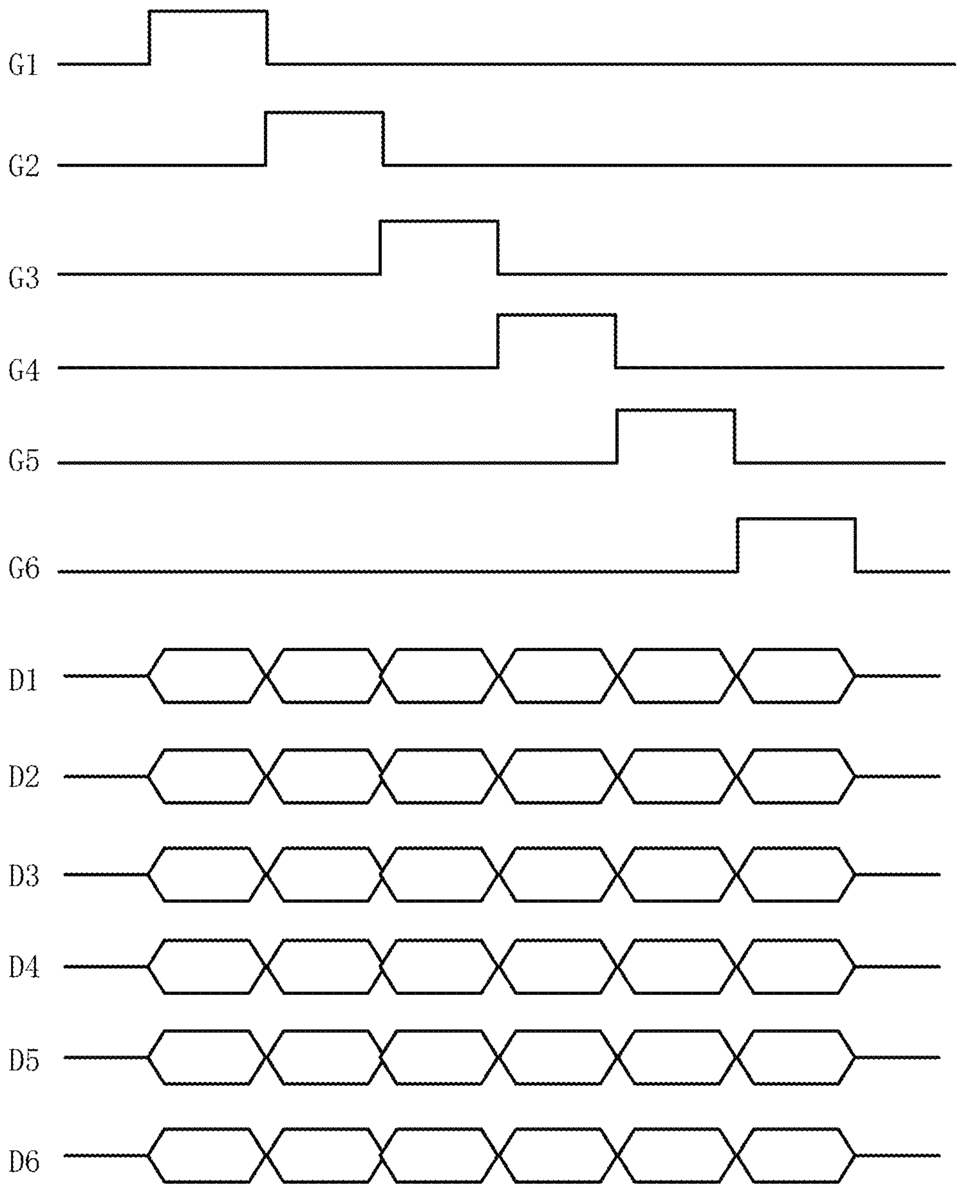
FIG. 7 illustrates a timing diagram of the backlight structure in the first display mode, consistent with the disclosed embodiments of the present disclosure.
Figure 8:
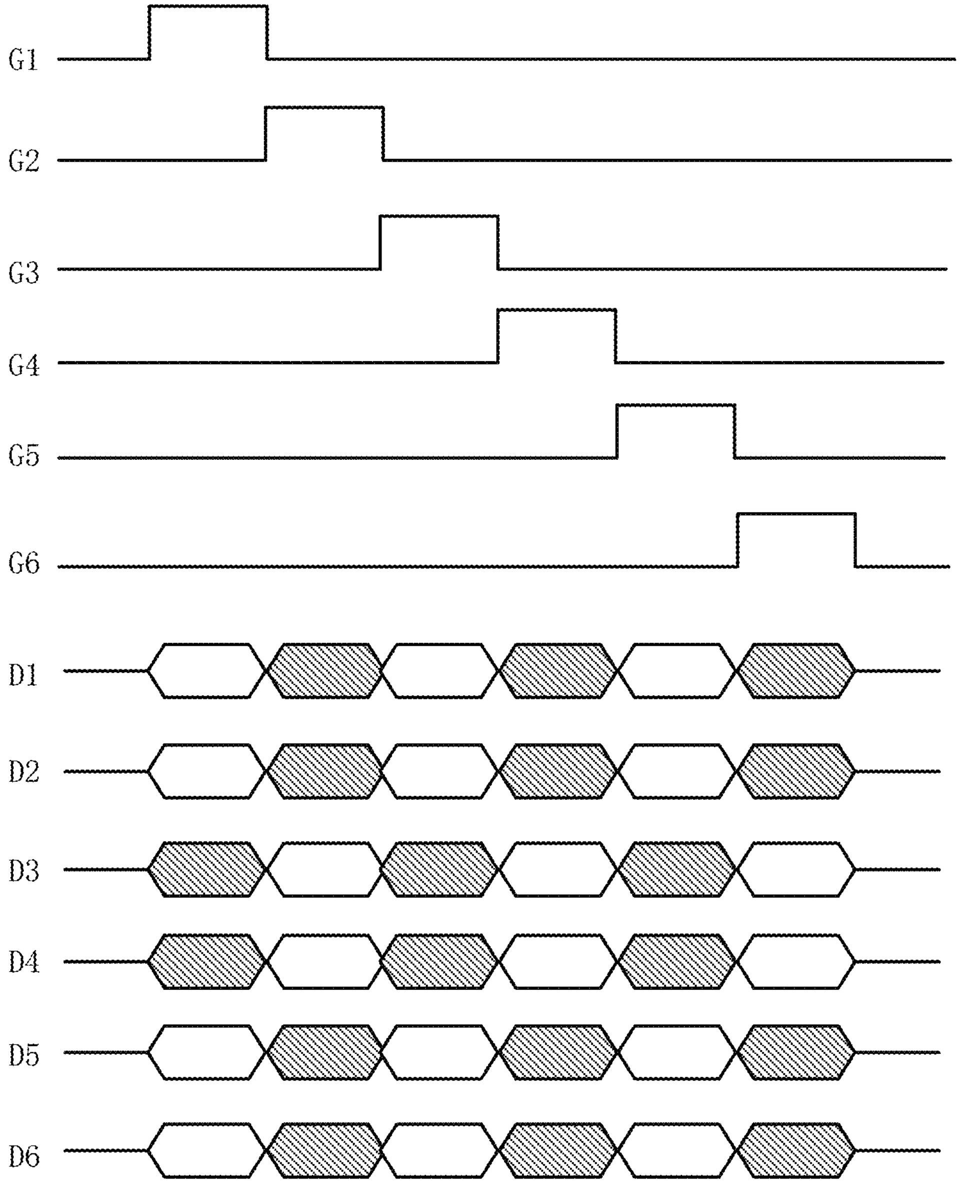
FIG. 8 illustrates a timing diagram of the backlight structure in the second display mode, consistent with the disclosed embodiments of the present disclosure.

Specifically, FIG. 7 illustrates a timing diagram of the backlight structure in the first display mode, and FIG. 8 illustrates a timing diagram of the backlight structure in the second display mode. Exemplarily, referring to FIGS. 6 and 7, in the first display mode, enable signals are provided to each scan line G sequentially row by row, and the time for providing the enable signals to the scan lines G is staggered from each other. Each data line D is individually controlled. In this case, the quantity of the light-emitting units 13 in each backlight partition in the backlight structure 10 shown in FIG. 6 is one. Referring to FIGS. 6 and 8, in the second display mode, enable signals are provided to each scan line G sequentially row by row, and the time for providing enable signals to the scan lines G is staggered from each other. From the first data line D to the last data line D, the signals of every two data lines D are same. Exemplarily, the signals of the first data line D and the second data line D are same, the signals of the third data line D and the fourth data line D are the same, and so on. In this case, the quantity of the light-emitting units 13 in each backlight partition in the backlight structure 10 shown in FIG. 6 is 2×2. That is, the quantity of the light-emitting units 11 in each backlight partition may be adjusted through the signals of the data lines D and/or the scan lines G in the first display mode and in the second display mode.

It should be noted that FIG. 7 exemplarily shows a timing sequence of the backlight structure in the first display mode, and FIG. 8 exemplarily shows a timing sequence of the backlight structure in the second display mode. In some other embodiments, the timing of the backlight structure in the first display mode and the second display mode may be set according to the quantity of the light-emitting units 11 in the backlight partition.

In some embodiments, the data lines may be used to transmit signals to adjust the ratio of the light-emitting units used for emitting light and the light-emitting units not used for emitting light in the backlight partition in the second display mode. The scan lines may also be used to transmit signals to adjust the ratio of the light-emitting units used for emitting light and the light-emitting units not used for emitting light in the backlight partition in the second display mode.

Figure 9:
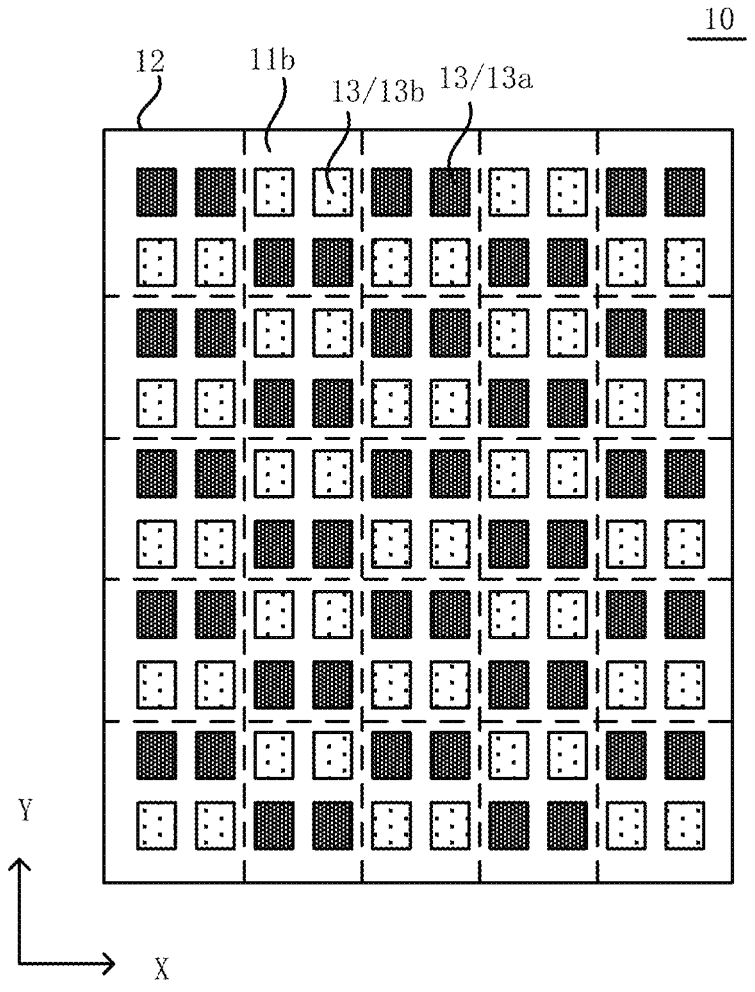
FIG. 9 illustrates another lighting diagram of the backlight structure in the second display mode, consistent with the disclosed embodiments of the present disclosure.

Specifically, FIG. 9 illustrates another lighting diagram of the backlight structure in the second display mode, consistent with the disclosed embodiments of the present disclosure. In the drawings of the present disclosure, as shown in FIG. 8, the filled part in the signal of the data line indicates that the signal to the data line at this time makes the corresponding light-emitting unit not emit light, or, at this time, no signal is provided to the data line such that the corresponding light-emitting unit does not emit light. Exemplarily, referring to FIGS. 8 and 9, in the second display mode, the enable signals are provided to each scan line G sequentially row by row, and the time to provide the enable signals to the scan line G is staggered from each other. From the first data line D to the last data line D, the signals of every two data lines D are same, such that the quantity of the light-emitting units 13 in each backlight partition **11*b* in the backlight structure 10 is 2×2. In addition, through the adjustment of the signal on each data line D, in the second display mode, the light-emitting units 13*a* used for emitting light in each backlight partition 11*b* in the backlight structure 10 may be arranged along the first direction X, and the light-emitting units 13*b*** not used for emitting light may be arranged along the first direction X.

Optionally, in the second display mode, in two adjacent backlight partitions **11*b* along the first direction X, the light-emitting units 13*a* used for emitting light and the light-emitting units 13*b* not used for emitting light may be arranged alternately. As such, the overall uniformity of the light source of the backlight structure 10** may be improved, and the display effect may thus be improved.

Figure 10:
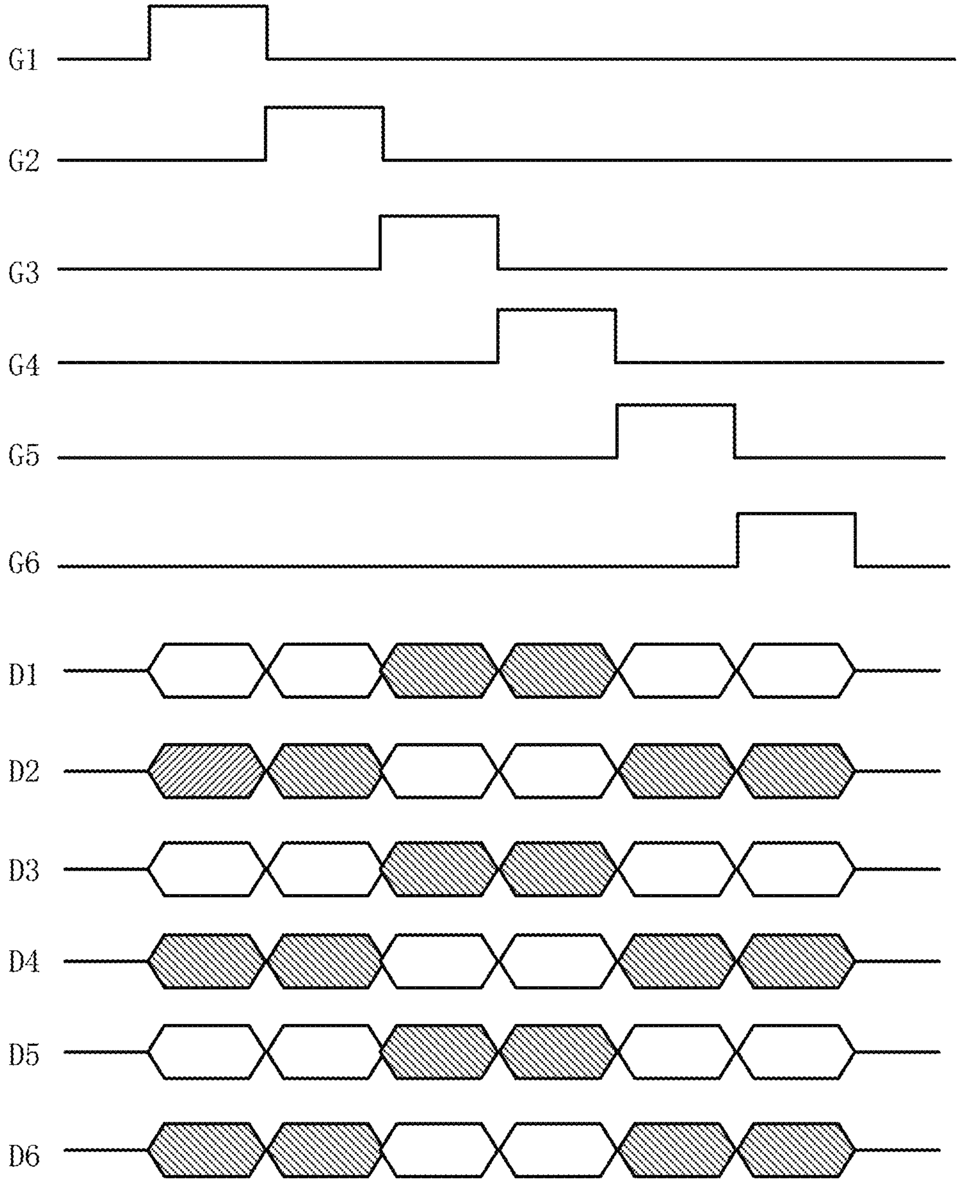
FIG. 10 illustrates another timing diagram of the backlight structure in the second display mode, consistent with the disclosed embodiments of the present disclosure.
Figure 11:
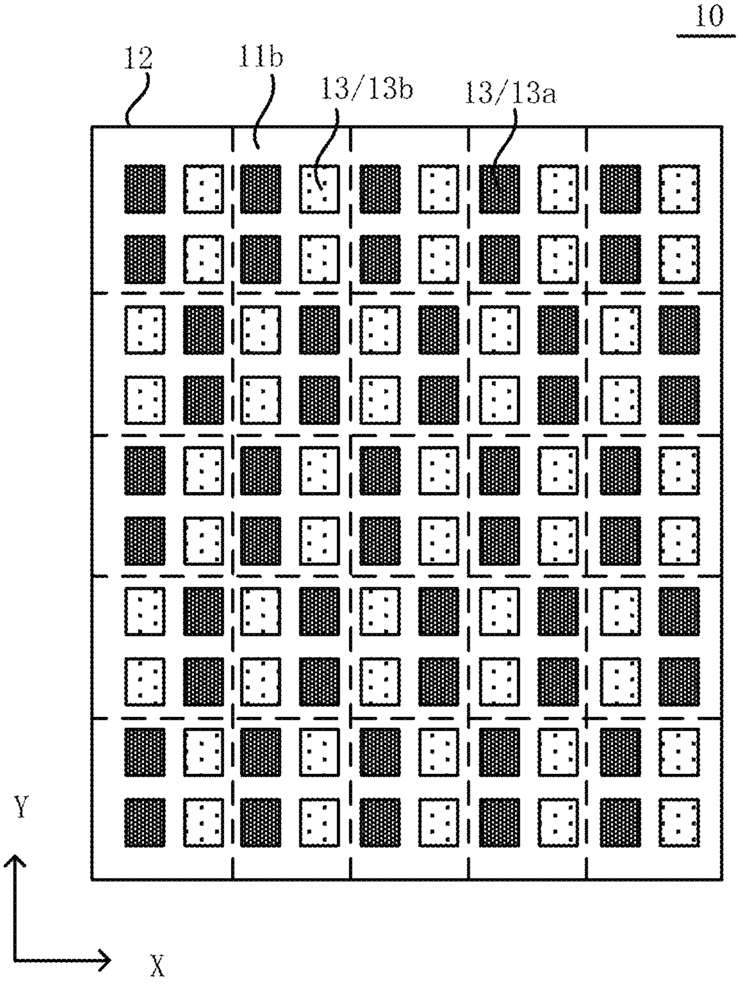
FIG. 11 illustrates another lighting diagram of the backlight structure in the second display mode, consistent with the disclosed embodiments of the present disclosure.

FIG. 10 illustrates another timing diagram of the backlight structure in the second display mode. FIG. 11 illustrates another lighting diagram of the backlight structure in the second display mode. Referring to FIGS. 10 and 11, in the second display mode, enable signals are provided to each scan line G sequentially row by row, and the time of providing enable signals to the scan lines G is staggered from each other. Each data line D is controlled independently. Accordingly, the quantity of the light-emitting units 13 in each backlight partition **11*b* in the backlight structure 10 is 2×2. In addition, through the adjustment of the signal on each data line D, in the second display mode, the light-emitting units 13*a* used for emitting light in each backlight partition 11*b* in the backlight structure 10 may be arranged along the second direction Y, and the light-emitting units 13*b*** not used for emitting light may be arranged along the second direction Y.

Optionally, in the second display mode, in two adjacent backlight partitions **11*b* along the second direction Y, the light-emitting units 13*a* used for emitting light and the light-emitting units 13*b* not used for emitting light may be arranged alternately. As such, the overall uniformity of the light source of the backlight structure 10** may be improved, and thus the display effect may be improved.

Figure 12:
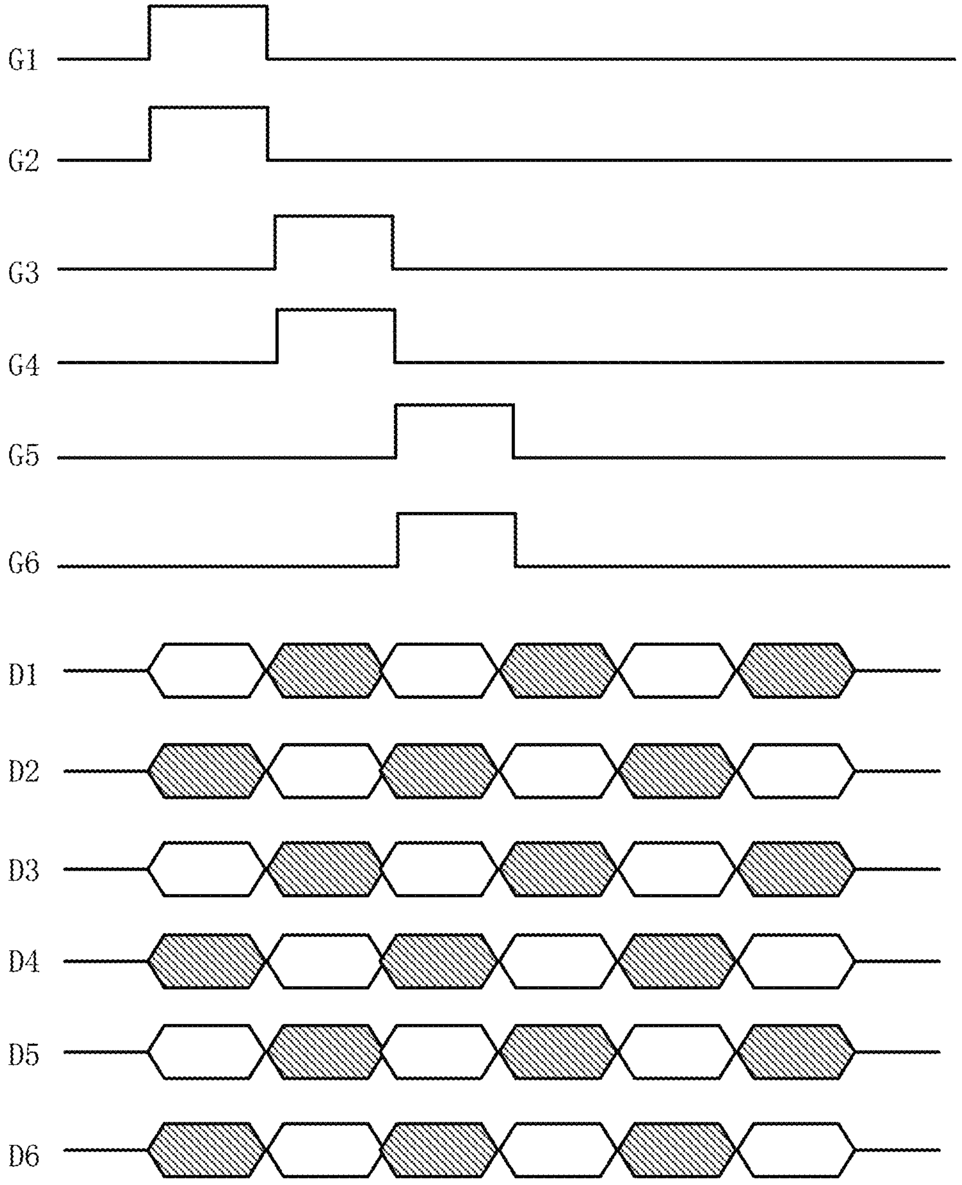
FIG. 12 illustrates another timing diagram of the backlight structure in the second display mode, consistent with the disclosed embodiments of the present disclosure.

FIG. 12 illustrates another timing diagram of the backlight structure in the second display mode, consistent with the disclosed embodiments of the present disclosure. Referring to FIGS. 11 and 12, in the second display mode, from the first scan line G to the last scan line G, every two scan lines G are a scan line group. The signals of the scan lines G in a same scan line group are same. The enable signals are sequentially provided to the scan lines G in each scan line group, and the time for providing the enable signals to the scan lines G in each scan line group is staggered from each other. Each data line D is controlled independently. As such, the quantity of the light-emitting units 13 in each backlight partition **11*b* in the backlight structure 10 is also 2×2. In addition, through the adjustment of the signal on each data line D, in the second display mode, the light-emitting units 13*a* used for emitting light in each backlight partition 11*b* in the backlight structure 10 may be arranged along the second direction Y, and the light-emitting units 13*b*** not used for emitting light may be arranged along the second direction Y.

Figure 13:
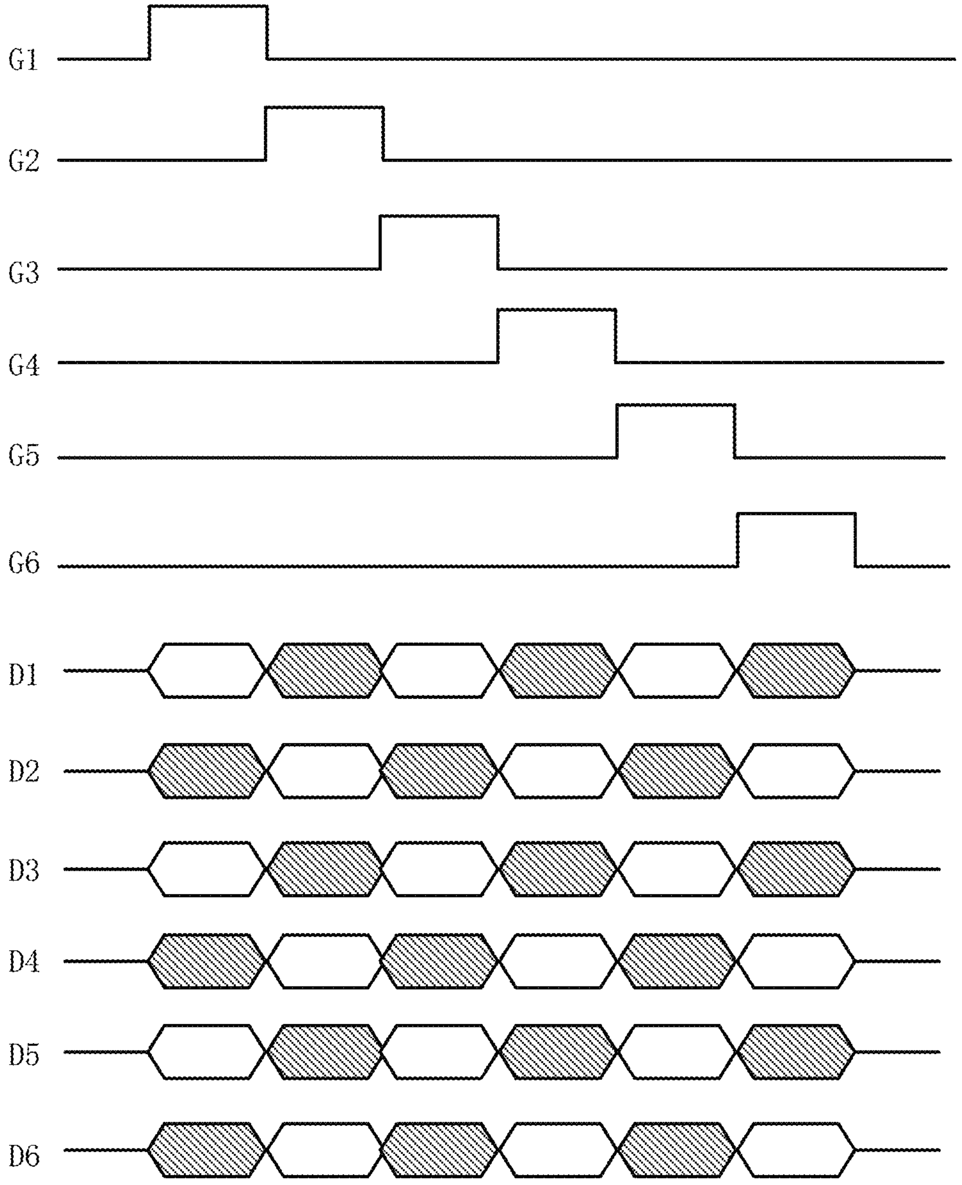
FIG. 13 illustrates another timing diagram of the backlight structure in the second display mode, consistent with the disclosed embodiments of the present disclosure.
Figure 14:
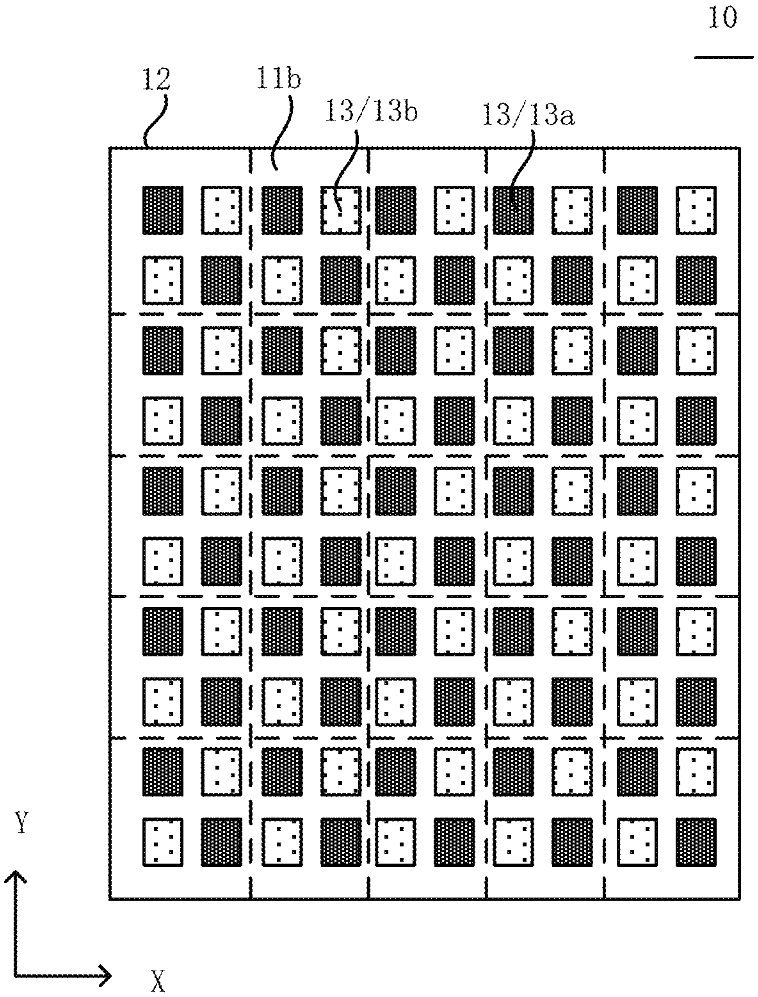
FIG. 14 illustrates another lighting diagram of the backlight structure in the second display mode, consistent with the disclosed embodiments of the present disclosure.

FIG. 13 illustrates another timing diagram of the backlight structure in the second display mode, consistent with the disclosed embodiments of the present disclosure. FIG. 14 illustrates another lighting diagram of the backlight structure in the second display mode, consistent with the disclosed embodiments of the present disclosure. Referring to FIGS. 13 and 14, in the second display mode, enable signals are provided to each scan line G sequentially row by row, and the time of providing enable signals to scan lines G is staggered from each other. Each data line D is controlled independently. Accordingly, the quantity of the light-emitting units 13 in each backlight partition **11*b* in the backlight structure 10 is also 2×2. In addition, through the adjustment of the signal on each data line D, in the second display mode, in the backlight structure 10, the light-emitting units 13***a* used for emitting light and the light-emitting units 13*b* not used for emitting light in each backlight partition 11*b* may be alternately arranged in the first direction X and the second direction Y.

In the second display mode, the ratio of the light-emitting unit 13*a* used for emitting light to the light-emitting unit 13*b* not used for emitting light in the backlight partition 11*b* may be adjusted through the signals of the data lines D and/or the scan lines G. In addition, the arrangement of the light-emitting units 13*a* used for emitting light and the light-emitting units 13*b* not used for emitting light in the backlight partition 11*b* may be adjusted through the signals of the data lines D and/or the scan lines G.

It should be noted that, in the present disclosure, in the second display mode, when the quantity of the light-emitting units 13 in each backlight partition 11*b* in the backlight structure 10 is 2×2, a plurality of arrangements of the light-emitting units 13*a* used for emitting light and the light-emitting units 13*b* not used for emitting light in the backlight partition 11*b* may be achieved through the adjustment of the signals of the data lines D and the scan lines G. In some other embodiments, other signal adjustment methods may also be used. The present disclosure will not go into details here.

In the second display mode, when the numbers of light-emitting units 13 in each backlight partition 11*b* in the backlight structure 10 are other numbers, realization of arrangements of the light-emitting units 13*a* used for emitting light and the light-emitting units 13*b* not used for emitting light in the backlight partition 11*b* through the adjustment of signals in the data lines D and the scan lines G may refer to the adjustment of the signals of the data lines D and the scan lines G presented in the present disclosure. The present disclosure will not go into details here.

Figure 15:
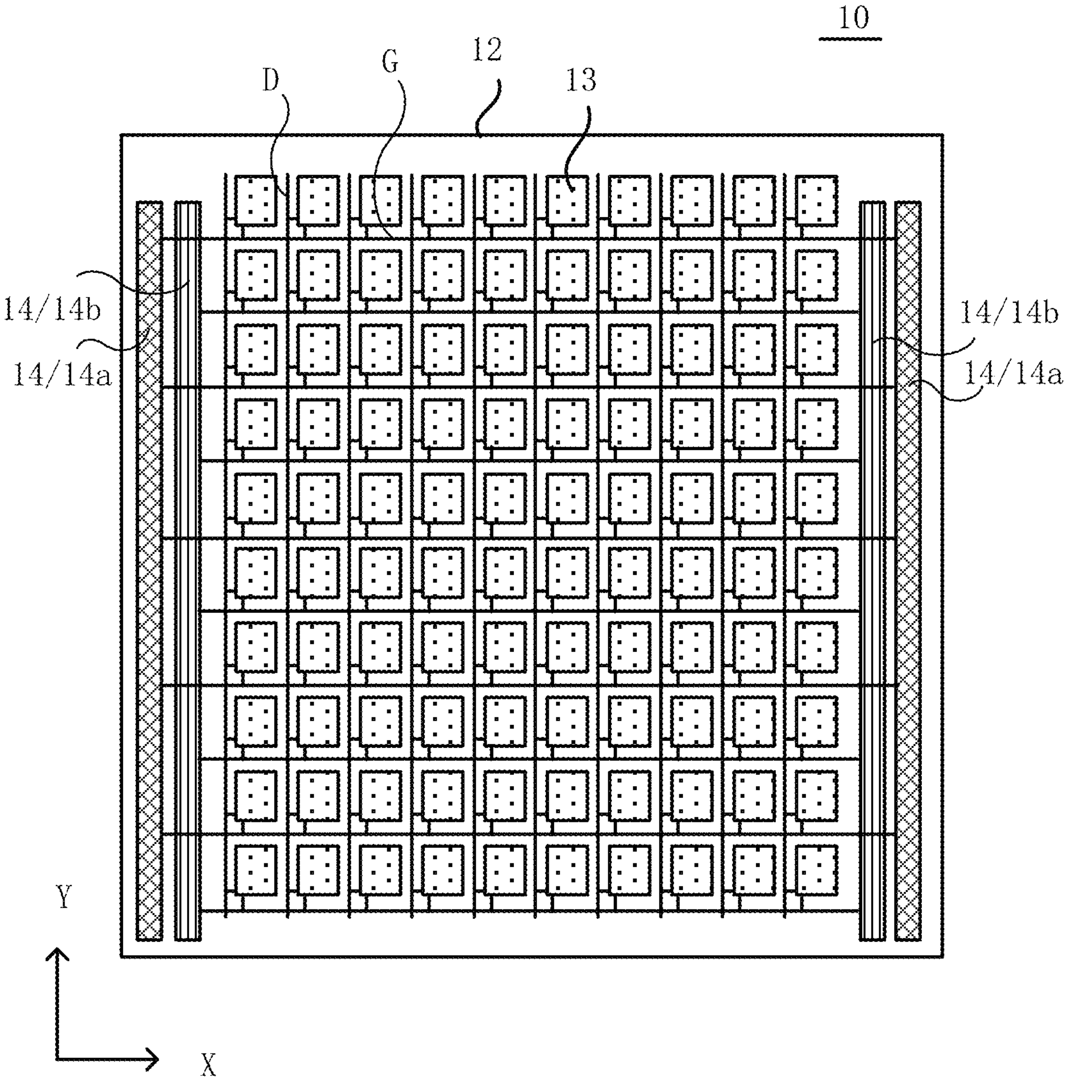
FIG. 15 illustrates another structural schematic diagram of the backlight structure consistent with the disclosed embodiments of the present disclosure.

FIG. 15 illustrates another structural schematic diagram of the backlight structure consistent with the disclosed embodiments of the present disclosure. Referring to FIG. 15, in some embodiments, the backlight structure 10 may further include two or more shift-register groups 14. Two adjacent scan lines G may be electrically connected to different shift-register groups 14 respectively. That is, adjacent scan lines G may be electrically connected to different shift-register groups 14.

Referring to FIGS. 11, 12 and 15, in the second display mode, from the first scan line G to the last scan line G, every two scan lines G are a scan line group. The signals of the scan lines G in a same scan line group are same. Enable signals are provided to the scan lines G in each scan line group sequentially, and the time for providing the enable signals to the scan lines G in each scan line group is staggered from each other. Each data line D is controlled independently. Accordingly, the quantity of the light-emitting units 13 in each backlight partition 11*b* in the backlight structure 10 is also 2×2. Furthermore, through the adjustment of the signals on each data line D, in the second display mode, the light-emitting units 13*a* used for emitting light in each backlight partition 11*b* in the backlight structure 10 may be arranged along the second direction Y, and the light-emitting units 13*b* not used for emitting light may be arranged along the second direction Y.

The backlight structure 10 may also include at two or more shift-register groups 14. Two adjacent scan lines G may be electrically connected to different shift-register groups 14 respectively. That is, the scan lines G in each scan line group may be electrically connected to different shift-register groups 14. Two shift-register groups 14 may simultaneously provide same signals to different scan lines G in a same scan line group that are electrically connected to the two shift-register groups 14. Thus, the signals of the scan lines G in the same scan line group may be same. Accordingly, the difficulty of driving the scan lines G by the shift-register groups 14 may be reduced, the design difficulty of the register groups 14 may be reduced, and the production cost may be decreased.

In one embodiment, the backlight structure 10 includes two shift-register groups 14. The two shift-register groups 14 are respectively a shift-register group 14*a* and a shift-register group 14*b*. Adjacent scan lines G are electrically connected to the shift-register group 14*a* and the shift-register group 14*b* respectively. In some other embodiments, the backlight structure 10 may include other numbers of shift-register groups 14. The connection methods between the shift-register groups 14 and each scan line G may be set with reference to the present disclosure.

Optionally, a shift-register group 14 may include two gate drive circuits. One scan line G may be electrically connected to the two gate drive circuits. Accordingly, the drive capability of the scan line G may be improved. In some other embodiments, a shift-register group 14 may include one gate driving circuit, and the present disclosure will not go into details here.

The present disclosure also provides a driving method for a display module. With continuous reference to FIGS. 1-4, the display module includes a backlight structure 10. The display module also includes a display panel 20, and the backlight structure 10 is arranged opposite to the display panel 20. The display panel 20 is located on a light-exiting surface of the backlight structure 10, and the backlight structure 10 provides a light source for the display panel 20. The backlight structure 10 may include a plurality of backlight partitions 11. That is, in the backlight structure 10, the backlight structure 10 may be divided into a plurality of backlight partitions 11.

The driving method includes:

The display module may have a first display mode and a second display mode. The resolution of the display module in the first display mode is greater than the resolution of the display module in the second display mode. That is, in the first display mode, the display module may display a high-resolution picture, and in the second display mode, the display module may display a low-resolution picture.

In the first display mode, the backlight partitions 11*a* of the backlight structure 10 may be adjusted such that the quantity of the backlight partitions 11*a* of the backlight structure 10 is n1, and the area of the backlight partitions 11*a* of the backlight structure 10 is S1.

In the second display mode, the backlight partition 11*b* of the backlight structure 10 may be adjusted such that the quantity of the backlight partition 11*b* of the backlight structure 10 is n2, and the area of the backlight partition 11*b* of the backlight structure 10 is S2, with n1>n2, S1<S2. That is, the quantity of backlight partitions 11*a* of the backlight structure 10 in the first display mode may be greater than the quantity of backlight partitions 11*b* of the backlight structure 10 in the second display mode. Accordingly, the area of each backlight partition 11*a* in the first display mode may be smaller than the area of each backlight partition 11*a* in the second display mode.

Specifically, in the driving method of the display module provided by the present disclosure, the area of the backlight partition 11 in the backlight structure 10 may be adjusted according to the display mode of the display module. When the display module displays a high-resolution picture, the backlight structure 10 may be divided into more backlight partitions 11, and thus the area of each backlight partition 11 in the backlight structure 10 may be reduced. Accordingly, at the edge of the picture displayed by the display module, the area of the backlight partition 11 may be relatively small. In this case, even if a light source may exist at the edge of the display screen that does not need a light source, the area of the light source in this part may be small. As such, the halos at the edge of the display screen may be alleviated, and may even be negligible. Accordingly, the difficulty of adjusting the fineness of the high-resolution picture may be reduced, problems such as the halos at the edge of the picture displayed may be alleviated, and the display effect may thus be improved.

With continuous reference to FIGS. 1-4, in some embodiments, the backlight structure 10 may include a substrate 12 and a plurality of light-emitting units 13 located on one side of the substrate 12. Optionally, the light-emitting unit 13 may be a mini light-emitting diode (mini-LED). When the mini-LED is used as a surface light source in the backlight structure 10, the backlight structure 10 may not need structures such as light guide plates and reflectors. Accordingly, the thickness of the backlight structure 10 may be reduced.

It should be noted that, in some other embodiments, the light-emitting unit 13 may also be an LED or a Micro-LED. The present disclosure will not go into details here.

In the first display mode, the quantity of the light-emitting units 13 in one backlight partition 11*a* is N1. In the second display mode, the quantity of the light-emitting units 13 in one backlight partition 11*b* is N2, with N1<N2. Exemplarily, referring to FIG. 3, in the first display mode, the quantity of the light-emitting units 13 in the backlight partition 11*a* of the backlight structure 10 is 2×1. Referring to FIG. 4, in the second display mode, the quantity of the light-emitting units 13 in the backlight partition 11*b* of the backlight structure 10 is 2×2. That is, the quantity of the light-emitting units 13 in the backlight partition 11*a* of the backlight structure 10 in the first display mode is smaller than the quantity of the light-emitting units 13 in the backlight partition 11*b* of the backlight structure 10 in the second display mode. Accordingly, the area of each backlight partition 11*a* in the first display mode is smaller than the area of each backlight partition 11*b* in the second display mode.

Specifically, in the display module provided by the present disclosure, the area of the backlight partition 11 in the backlight structure 10 may be adjusted according to the display mode of the display module. When the display module displays a high-resolution picture, the quantity of the light-emitting units 13 in each backlight partition 11 in the backlight structure 10 may be reduced. Accordingly, the area of each backlight partition 11 in the backlight structure 10 may be decreased. As such, the difficulty of adjusting the fineness of the high-resolution picture may be reduced, problems such as halos at the edge of the picture displayed may be alleviated, and the display effect may thus be improved.

In some embodiments, in the second display mode, some light-emitting units in the backlight partition may not emit light. FIG. 5 illustrates a lighting diagram of the backlight structure in a second display mode. With reference to FIG. 5, in the second display mode, when the backlight partition 11*b* in the backlight structure 10 needs to provide a light source, the light-emitting units 13*a* may be used to emit light, and the light-emitting units 13*b* may not be used to emit light.

Specifically, in one embodiment, the area of the backlight partition 11 in the backlight structure 10 may be adjusted according to the display mode of the display module. When the display module displays a high-resolution picture, the quantity of the light-emitting units 13 in each backlight partition 11 in the backlight structure 10 may be reduced, and the area of each backlight partition 11 in the backlight structure 10 may thus be reduced. Accordingly, the difficulty of adjusting the fineness of the high-resolution picture may be reduced, problems such as halos at the edge of the picture displayed may be alleviated, and the display effect may thus be improved. In addition, in the second display mode, the display module displays a low-resolution picture. When the backlight partition 11*b* in the backlight structure 10 needs to provide a light source, some light-emitting units 13 in the backlight partition 11*b* may not emit light. As such, while meeting the resolution requirement of the display screen of the display module, power consumption may be reduced, and device consumption may also be reduced.

With continuous reference to FIGS. 3, 4 and 6, in some embodiments, the plurality of light-emitting units 13 may be arranged in an array along a first direction X and a second direction Y. The first direction X and the second direction Y intersect. Optionally, the first direction X and the second direction Y are perpendicular to each other.

The backlight structure 10 may further include a plurality of scan lines G extending along the first direction X and a plurality of data lines D extending along the second direction Y. The light-emitting units 13 arranged along the first direction X are electrically connected to a same scan line G. That is, an entire row of light-emitting units 13 arranged along the first direction X is electrically connected to a same scan line G. The light-emitting units 13 arranged along the second direction Y are electrically connected to a same data line D. That is, an entire column of light-emitting units 13 arranged along the second direction Y is electrically connected to a same data line D.

The data lines D may be used to transmit signals to adjust the quantity of the light-emitting units 13 in each backlight partition 11 in the first display mode and in the second display mode. The scan lines G may be used to transmit signals to adjust the quantity of the light-emitting units 13 in each backlight partition 11 in the first display mode and in the second display mode.

Specifically, FIG. 7 illustrates a timing diagram of the backlight structure in the first display mode, and FIG. 8 illustrates a timing diagram of the backlight structure in the second display mode. Exemplarily, referring to FIGS. 6 and 7, in the first display mode, enable signals are provided to each scan line G sequentially row by row, and the time for providing the enable signals to the scan lines G is staggered from each other. Each data line D is individually controlled. In this case, the quantity of the light-emitting units 13 in each backlight partition in the backlight structure 10 shown in FIG. 6 is one. Referring to FIGS. 6 and 8, in the second display mode, enable signals are provided to each scan line G sequentially row by row, and the time for providing enable signals to the scan lines G is staggered from each other. From the first data line D to the last data line D, the signals of every two data lines D are same. Exemplarily, the signals of the first data line D and the second data line D are same, the signals of the third data line D and the fourth data line D are the same, and so on. In this case, the quantity of the light-emitting units 13 in each backlight partition in the backlight structure 10 shown in FIG. 6 is 2×2. That is, the quantity of the light-emitting units 11 in each backlight partition may be adjusted through the signals of the data lines D and/or the scan lines G in the first display mode and in the second display mode.

In some embodiments, in the second display mode, the ratio of the light-emitting units used for emitting light and the light-emitting units not used for emitting light in the backlight partition may be adjusted by the signals of the data lines and/or the scan lines.

Specifically, with continuous reference to FIGS. 8 and 9, in the second display mode, enable signals are provided to each scan line G sequentially row by row, and the time to provide the enable signals to the scan line G is staggered from each other. From the first data line D to the last data line D, the signals of every two data lines D are same, such that the quantity of the light-emitting units 13 in each backlight partition 11*b* in the backlight structure 10 is 2×2. In addition, through the adjustment of the signal on each data line D, in the second display mode, the light-emitting units 13*a* used for emitting light in each backlight partition 11*b* in the backlight structure 10 may be arranged along the first direction X, and the light-emitting units 13*b* not used for emitting light may be arranged along the first direction X.

With continuous reference to FIGS. 10 and 11, in the second display mode, the enable signals are provided to each scan line G sequentially row by row, and the time to provide the enable signals to the scan line G is staggered from each other. From the first data line D to the last data line D, the signals of every two data lines D are same, such that the quantity of the light-emitting units 13 in each backlight partition 11*b* in the backlight structure 10 is 2×2. In addition, through the adjustment of the signal on each data line D, in the second display mode, the light-emitting units 13*a* used for emitting light in each backlight partition 11*b* in the backlight structure 10 may be arranged along the second direction Y, and the light-emitting units 13*b* not used for emitting light may be arranged along the second direction Y.

With continuous reference to FIGS. 11 and 12, in the second display mode, from the first scan line G to the last scan line G, every two scan lines G are a scan line group. The signals of the scan lines G in a same scan line group are same. Enable signals are provided to the scan lines G in each scan line group sequentially, and the time for providing the enable signals to the scan lines G in each scan line group is staggered from each other. Each data line D is controlled independently. Accordingly, the quantity of the light-emitting units 13 in each backlight partition 11*b* in the backlight structure 10 is also 2×2. Furthermore, through the adjustment of the signals on each data line D, in the second display mode, the light-emitting units 13*a* used for emitting light in each backlight partition 11*b* in the backlight structure 10 may be arranged along the second direction Y, and the light-emitting units 13*b* not used for emitting light may be arranged along the second direction Y.

With continuous reference to FIGS. 13 and 4, in the second display mode, enable signals are provided to each scan line G sequentially row by row, and the time of providing enable signals to scan lines G is staggered from each other. Each data line D is controlled independently. Accordingly, the quantity of the light-emitting units 13 in each backlight partition 11*b* in the backlight structure 10 is also 2×2. In addition, through the adjustment of the signal on each data line D, in the second display mode, in the backlight structure 10, the light-emitting units 13*a* used for emitting light and the light-emitting units 13*b* not used for emitting light in each backlight partition 11*b* may be alternately arranged in the first direction X and the second direction Y.

FIGS. 7-14 exemplarily show the realization of a plurality of arrangements of the light-emitting units 13*a* used for emitting light and the light-emitting units 13*b* not used for emitting light in the backlight partition 11*b* through the adjustment of the signals of the data lines D and the scan lines G, when the quantity of the light-emitting units 13 in each backlight partition 11*b* in the backlight structure 10 is 2×2, in the second display mode.

Figure 16:
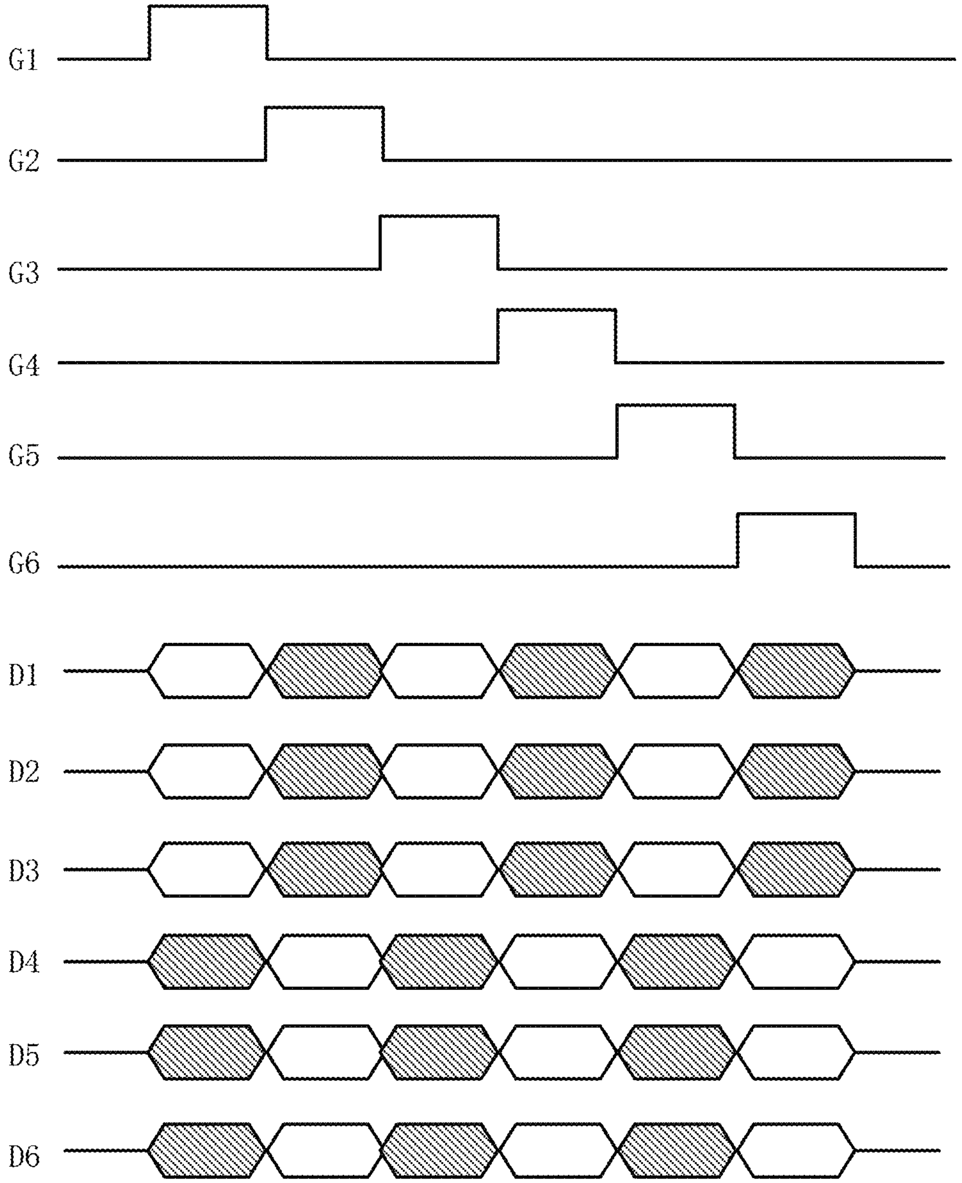
FIG. 16 illustrates another timing diagram of the backlight structure in the second display mode, consistent with the disclosed embodiments of the present disclosure.
Figure 17:
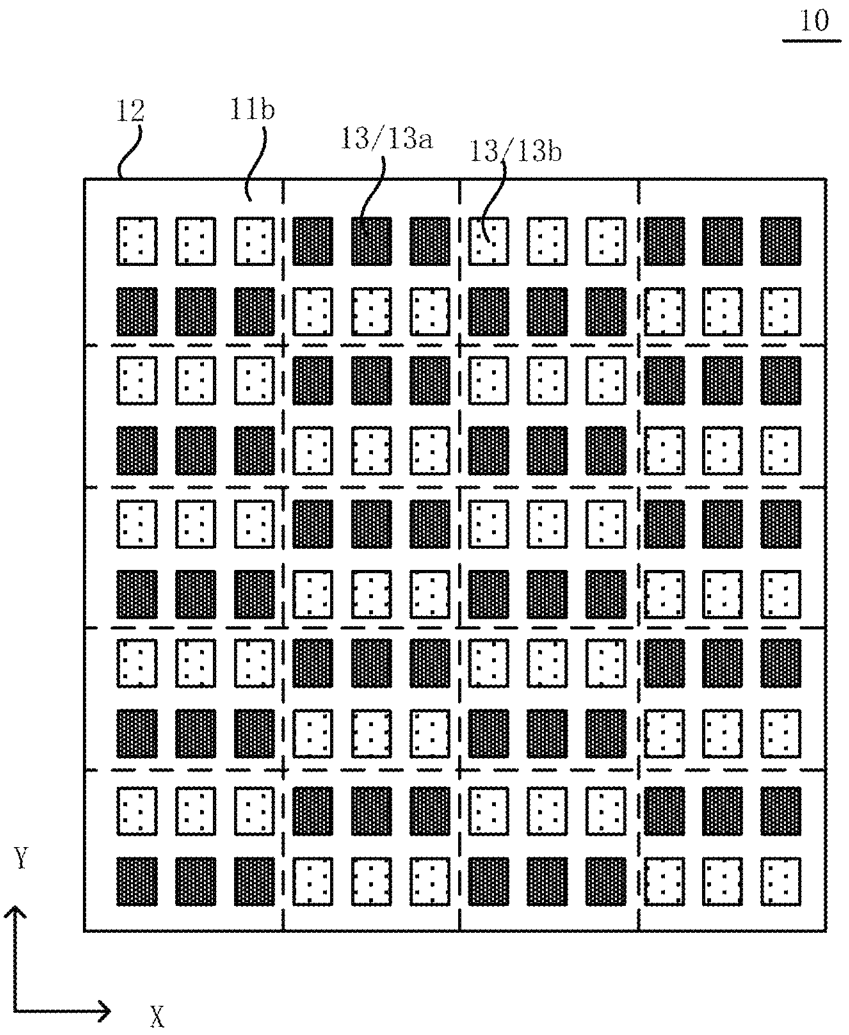
FIG. 17 illustrates another lighting diagram of the backlight structure in the second display mode, consistent with the disclosed embodiments of the present disclosure.

FIG. 16 illustrates another timing diagram of the backlight structure in the second display mode, consistent with the disclosed embodiments of the present disclosure. FIG. 17 illustrates another lighting diagram of the backlight structure in the second display mode, consistent with the disclosed embodiments of the present disclosure. Referring to FIGS. 16 and 17, enable signals are provided to the scan lines G sequentially row by row, and the time of providing the enable signals to the scan lines G are staggered from each other. From the first data line D to the last data line D, the signals of every three data lines D are same, such that the quantity of the light-emitting units 13 in each backlight partition 11*b* in the backlight structure 10 is 3×2. In addition, through the adjustment of the signal on each data line D, in the second display mode, the light-emitting units 13*a* used for emitting light in each backlight partition 11*b* in the backlight structure 10 may be arranged along the first direction X, and the light-emitting units 13*b* not used for emitting light in each backlight partition 11*b* in the backlight structure 10 may be arranged along the first direction X.

Figure 18:
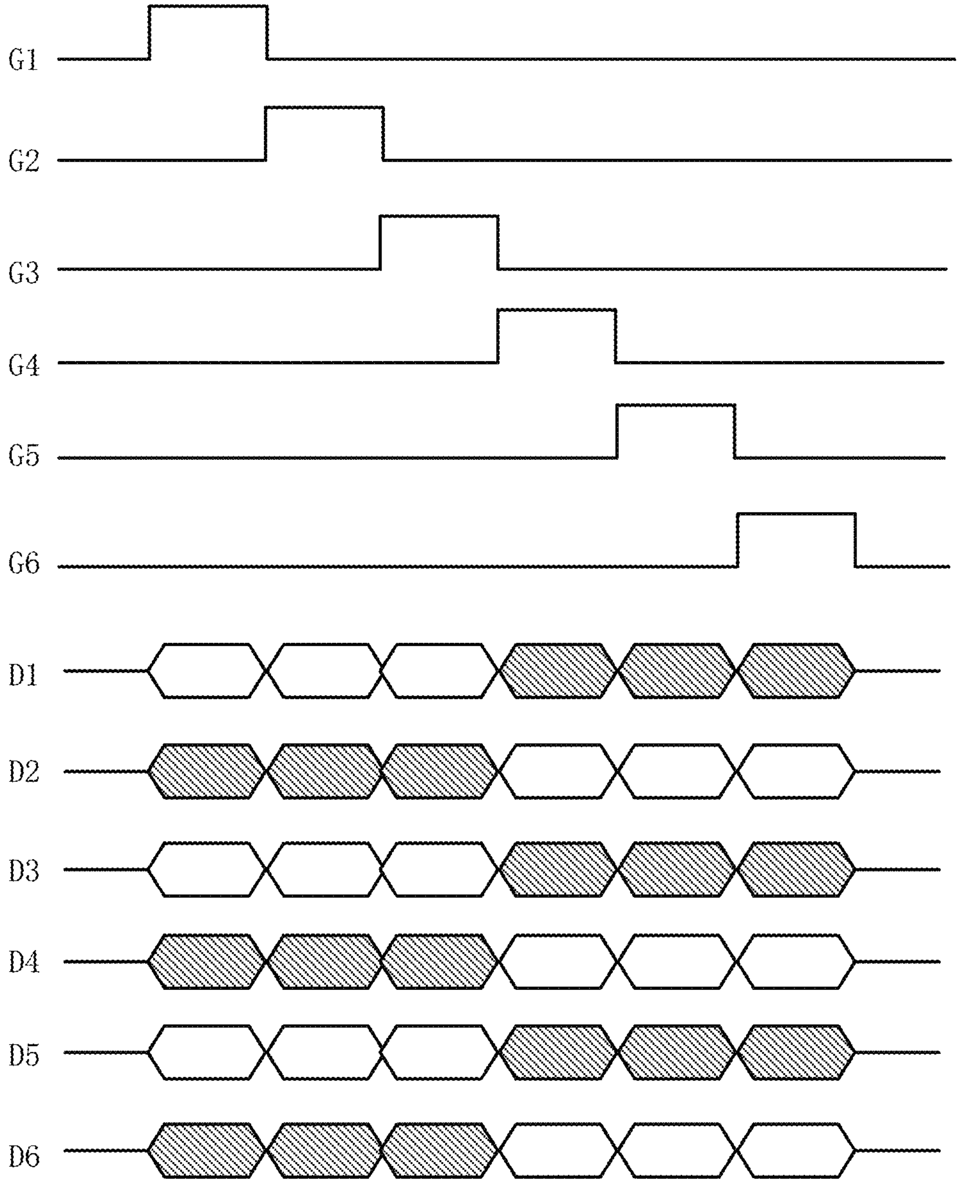
FIG. 18 illustrates another timing diagram of the backlight structure in the second display mode, consistent with the disclosed embodiments of the present disclosure.
Figure 19:
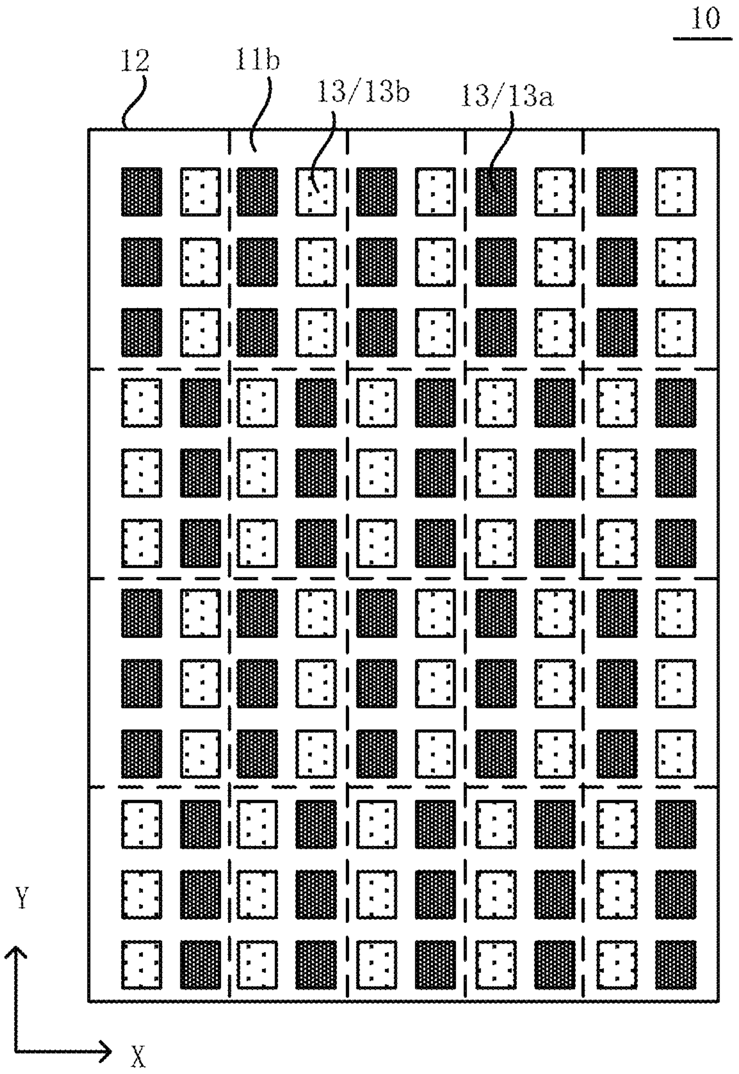
FIG. 19 illustrates another lighting diagram of the backlight structure in the second display mode, consistent with the disclosed embodiments of the present disclosure.

FIG. 18 illustrates another timing diagram of the backlight structure in the second display mode, consistent with the disclosed embodiments of the present disclosure. FIG. 19 illustrates another lighting diagram of the backlight structure in the second display mode, consistent with the disclosed embodiments of the present disclosure. Referring to FIGS. 18 and 19, enable signals are provided to each scan line G sequentially row by row, and each data line D is controlled independently, such that the quantity of the light-emitting units 13 in each backlight partition 11*b* in the backlight structure 10 is 2×3. In addition, through the adjustment of the signal on each data line D, in the second display mode, the light-emitting units 13*a* used for emitting light in each backlight partition 11*b* in the backlight structure 10 may be arranged along the second direction Y, and the light-emitting units 13*b* not used for emitting light may be arranged along the second direction Y.

Figure 20:
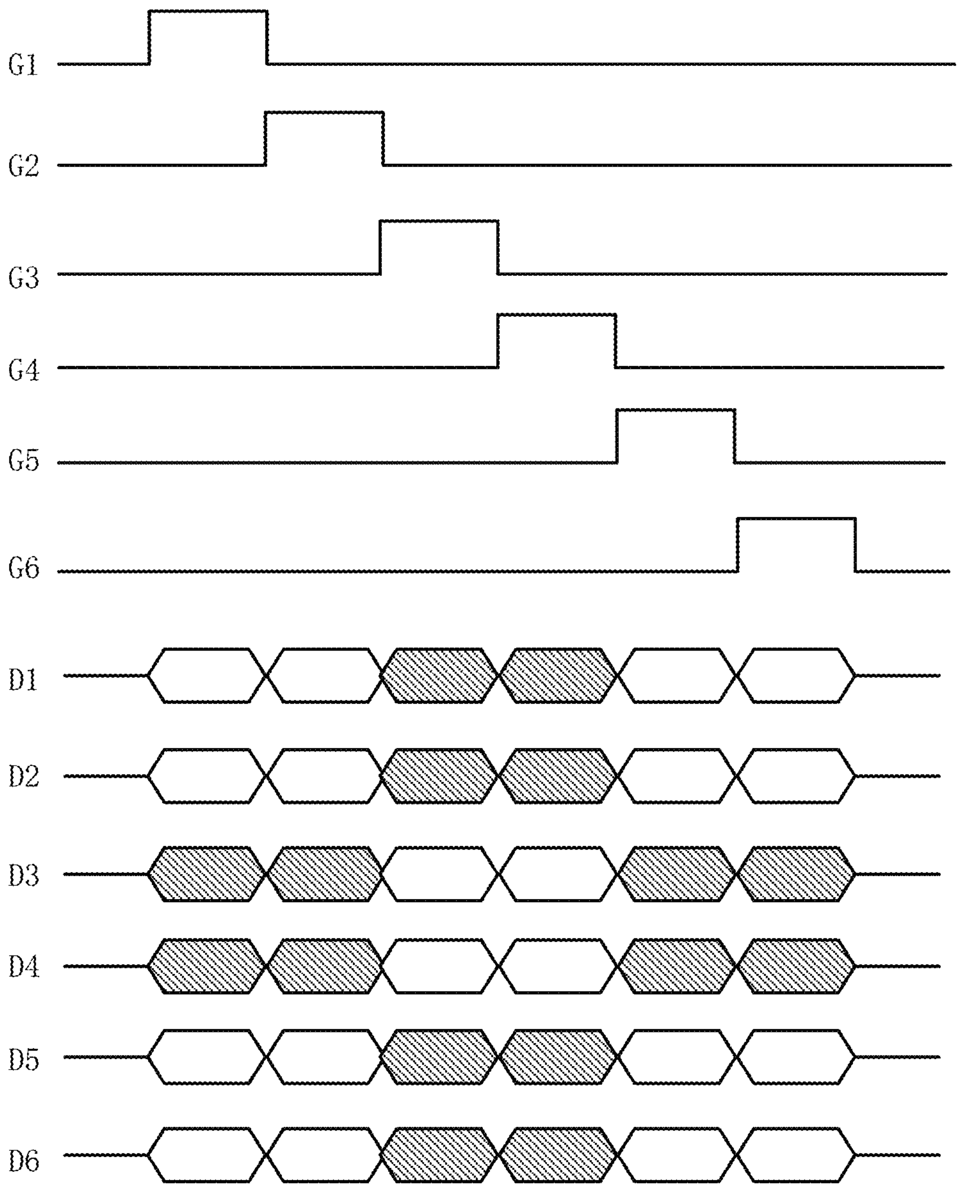
FIG. 20 illustrates another timing diagram of the backlight structure in the second display mode, consistent with the disclosed embodiments of the present disclosure.
Figure 21:
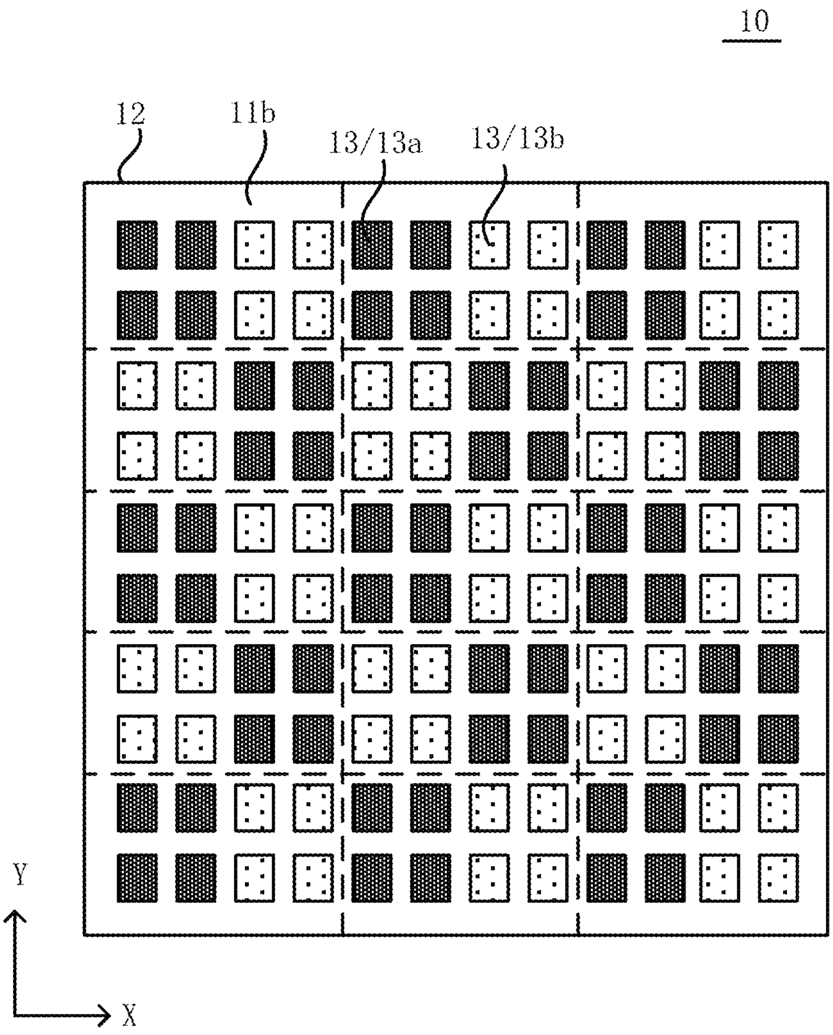
FIG. 21 illustrates another lighting diagram of the backlight structure in the second display mode, consistent with the disclosed embodiments of the present disclosure.

FIG. 20 illustrates another timing diagram of the backlight structure in the second display mode, consistent with the disclosed embodiments of the present disclosure. FIG. 21 illustrates another lighting diagram of the backlight structure in the second display mode, consistent with the disclosed embodiments of the present disclosure. Referring to FIGS. 20 and 21, enable signals are provided to the scan lines G sequentially row by row, and the time of providing the enable signals to the scan lines G is staggered from each other. From the first data line D to the last data line D, the signals of every two data lines D are same, such that the quantity of the light-emitting units 13 in each backlight partition 11*b* in the backlight structure 10 is 4×2. In addition, through the adjustment of the signal on each data line D, in the second display mode, in the backlight structure 10, the light-emitting units 13*a* used for emitting light in each backlight partition 11*b* may be arranged in a 2×2 matrix along the first direction X and the second direction Y. The light-emitting units 13*b* not used for emitting light may also be arranged in a 2×2 matrix along the first direction X and the second direction Y.

Figure 22:
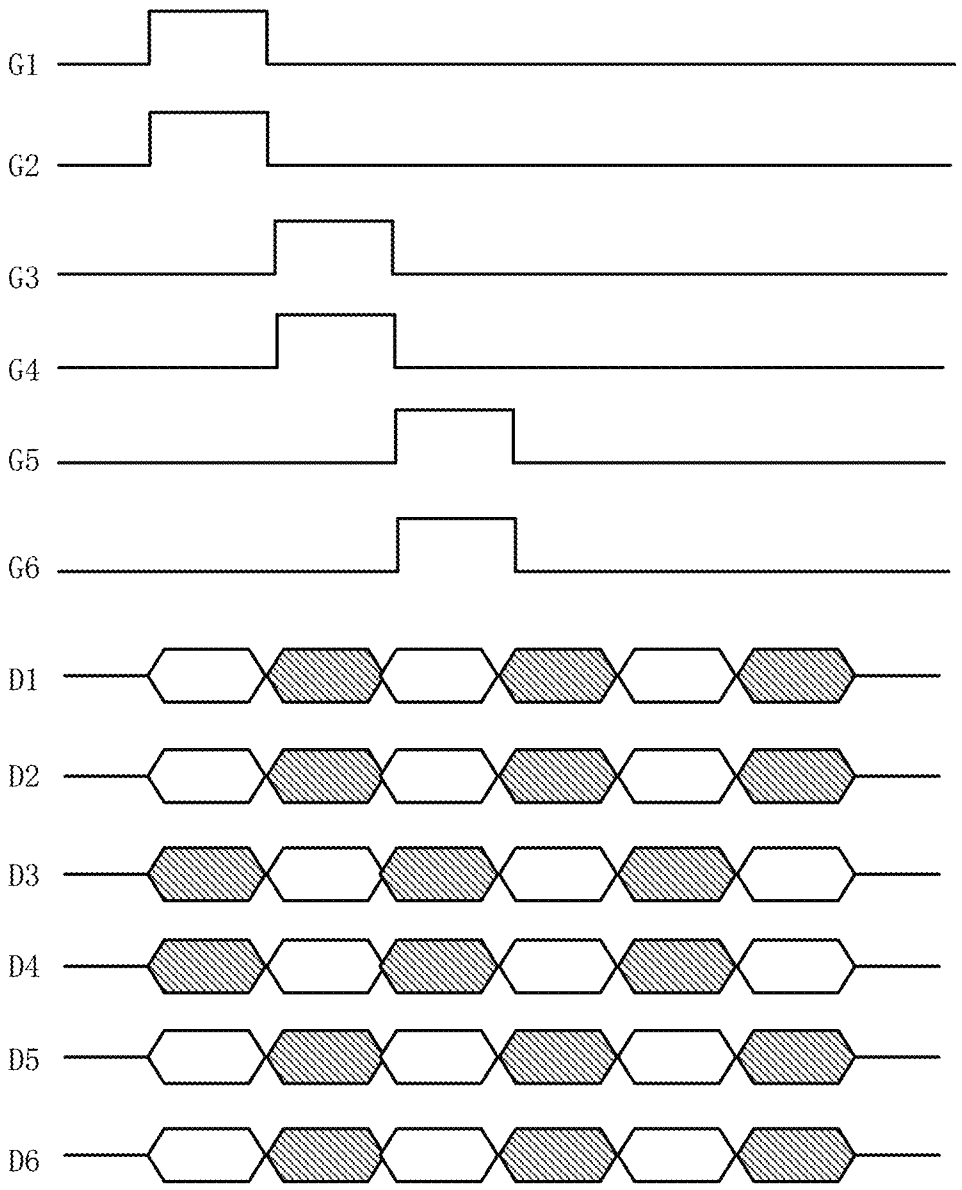
FIG. 22 illustrates another timing diagram of the backlight structure in the second display mode, consistent with the disclosed embodiments of the present disclosure.

FIG. 22 illustrates another timing diagram of the backlight structure in the second display mode, consistent with the disclosed embodiments of the present disclosure. Referring to FIGS. 21 and 22, in the second display mode, from the first scan line G to the last scan line G, every two scan lines G are a scan line group. The signals of the scan lines G in a same scan line group are same. Enable signals are provided to the scan lines G in each scan line group sequentially. The time to provide the enable signals to the scan lines G in each scan line group is staggered from each other. From the first data line D to the last data line D, the signals of every two data lines D are same, such that the quantity of the light-emitting units 13 in each backlight partition 11*b* in the backlight structure 10 is 4×2. In addition, through the adjustment of the signal on each data line D, in the second display mode, in the backlight structure 10, the light-emitting units 13*a* used for emitting light in each backlight partition 11*b* may be arranged in a 2×2 matrix along the first direction X and the second direction Y. The light-emitting units 13*b* not used for emitting light may also be arranged in a 2×2 matrix along the first direction X and the second direction Y.

As discussed above, in the second display mode, the ratio of the light-emitting unit 13*a* used for emitting light to the light-emitting unit 13*b* not used for emitting light in the backlight partition 11*b* may be adjusted through the signals of the data lines D and/or the scan lines G. In addition, the arrangement of the light-emitting units 13*a* used for emitting light and the light-emitting units 13*b* not used for emitting light in the backlight partition 11*b* may be adjusted through the signals of the data lines D and/or the scan lines G.

It should be noted that, in the present disclosure, in the second display mode, when the quantity of the light-emitting units 13 in each backlight partition 11*b* in the backlight structure 10 is 2×2, 3×2, 2×3, or 4×2, a plurality of arrangements of the light-emitting units 13*a* used for emitting light and the light-emitting units 13*b* not used for emitting light in the backlight partition 11*b* may be achieved through the adjustment of the signals of the data lines D and the scan lines G. In some other embodiments, other signal adjustment methods may also be used. The present disclosure will not go into details here.

In the second display mode, when the quantity of light-emitting units 13 in each backlight partition 11*b* in the backlight structure 10 is another number, realization of arrangements of the light-emitting units 13*a* used for emitting light and the light-emitting units 13*b* not used for emitting light in the backlight partition 11*b* through the adjustment of signals in the data lines D and the scan lines G may refer to the adjustment of the signals of the data lines D and the scan lines G presented in the present disclosure. The present disclosure will not go into details here.

In some embodiments, in the second display mode, among the data lines electrically connected to the light-emitting units in a same backlight partition, two or more data lines have a same signal. Accordingly, in the second display mode, each backlight partition may include a plurality of light-emitting units.

Exemplarily, with continuous reference to FIGS. 8 and 9, in the second display mode, enable signals are provided to each scan line G sequentially row by row, and the time to provide the enable signals to the scan line G is staggered from each other. From the first data line D to the last data line D, the signals of every two data lines D are same, such that the quantity of the light-emitting units 13 in each backlight partition 11*b* in the backlight structure 10 is 2×2. In addition, through the adjustment of the signal on each data line D, in the second display mode, the light-emitting units 13*a* used for emitting light in each backlight partition 11*b* in the backlight structure 10 may be arranged along the first direction X, and the light-emitting units 13*b* not used for emitting light may be arranged along the first direction X.

With continuous reference to FIG. 15, in some embodiments, the backlight structure 10 may further include two or more shift-register groups 14. Two adjacent scan lines G may be electrically connected to different shift-register groups 14 respectively. That is, adjacent scan lines G may be electrically connected to different shift-register groups 14.

Since adjacent scan lines G are electrically connected to different shift-register groups 14, in some embodiments, in the second display mode, scan enable signals may be simultaneously provided to two or more scan lines G of the scan lines G electrically connected to the light-emitting units 13 in a same backlight partition 11*b* through different shift-register groups 14.

Exemplarily, with continuous reference to FIGS. 11, 12 and 15, in the second display mode, from the first scan line G to the last scan line G, every two scan lines G are a scan line group. The signals of the scan lines G in a same scan line group are same. Enable signals are provided to the scan lines G in each scan line group sequentially, and the time for providing the enable signals to the scan lines G in each scan line group is staggered from each other. Each data line D is controlled independently. Accordingly, the quantity of the light-emitting units 13 in each backlight partition 11*b* in the backlight structure 10 is also 2×2. Furthermore, through the adjustment of the signals on each data line D, in the second display mode, the light-emitting units 13*a* used for emitting light in each backlight partition 11*b* in the backlight structure 10 may be arranged along the second direction Y, and the light-emitting units 13*b* not used for emitting light may be arranged along the second direction Y.

The backlight structure 10 may also include at two or more shift-register groups 14. Two adjacent scan lines G may be electrically connected to different shift-register groups 14 respectively. That is, the scan lines G in each scan line group may be electrically connected to different shift-register groups 14. Two shift-register groups 14 may simultaneously provide same signals to different scan lines G in a same scan line group that are electrically connected to the two shift-register groups 14. Thus, the signals of the scan lines G in the same scan line group may be same. Accordingly, the difficulty of driving the scan lines G by the shift-register groups 14 may be reduced, the design difficulty of the register groups 14 may be reduced, and the production cost may be decreased.

In one embodiment, the backlight structure 10 includes two shift-register groups 14. In some other embodiments, the backlight structure 10 may include other numbers of shift-register groups 14. The connection methods between the shift-register groups 14 and each scan line G may be set with reference to the present disclosure.

Figure 23:
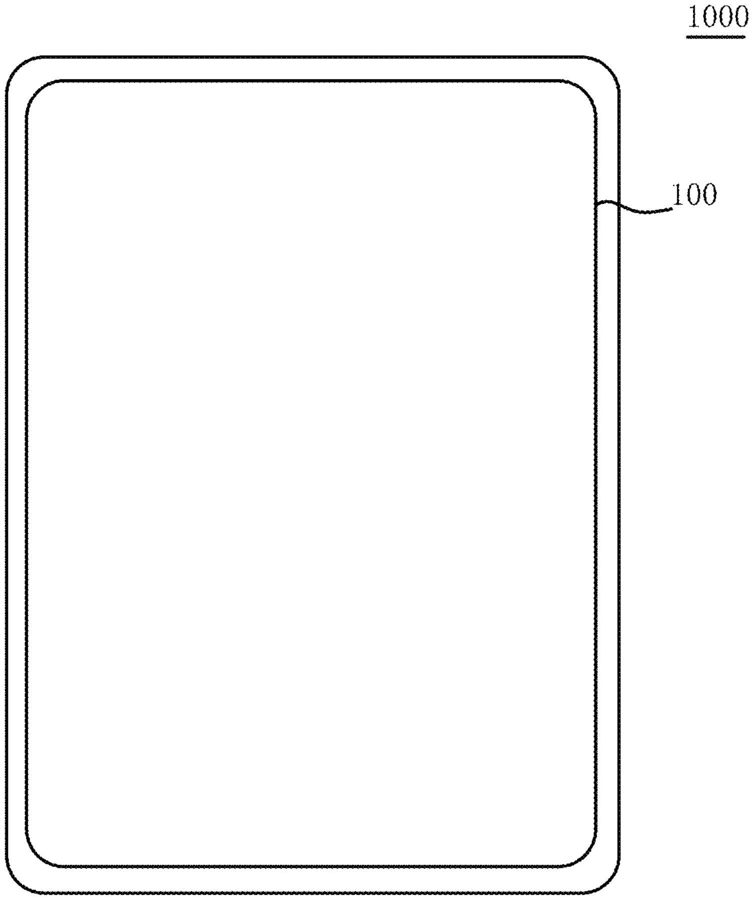
FIG. 23 illustrates a schematic plan view of a display device consistent with the disclosed embodiments of the present disclosure.

FIG. 23 illustrates a schematic plan view of a display device consistent with the disclosed embodiments of the present disclosure. The present disclosure also provides a display device 1000. The display device 1000 includes the display module 100 provided in the present disclosure. FIG. 23 only takes a mobile phone as an example to illustrate the display device 1000. In the present disclosure, the display device 1000 may also be other display devices 1000 with a display function, such as a computer, a television, a vehicle-mounted display device, etc. The present disclosure does not specifically limit types of display devices. The display device 1000 provided by the present disclosure has the beneficial effects of the display module 100 provided by the present disclosure. For details, reference may be made to the specific descriptions of the display module 100 in the present disclosure.

As disclosed, the technical solutions of the present disclosure have the following advantages.

In the display module provided by the present disclosure, the area of the backlight partition in the backlight structure may be adjusted according to the display mode of the display module. When the display module displays a high-resolution picture, the backlight structure may be divided into more backlight partitions, and thus the area of each backlight partition in the backlight structure may be reduced. Accordingly, at the edge of the picture displayed by the display module, the area of the backlight partition may be relatively small. As such, at the edge of the picture displayed, even if a light source may exist at the part that does not need a light source, the area of the part of the light source may be small. Thus, the halos at the edge of the picture displayed may be reduced, and may even be negligible. Accordingly, the difficulty of adjusting the fineness of high-resolution pictures may be decreased, problems such as halos on the edges of pictures displayed may be reduced, and display effects may thus be improved.

The embodiments disclosed herein are exemplary only and not limiting the scope of the present disclosure. Various combinations, alternations, modifications, equivalents, or improvements to the technical solutions of the disclosed embodiments may be obvious to those skilled in the art. Without departing from the spirit and scope of this disclosure, such combinations, alternations, modifications, equivalents, or improvements to the disclosed embodiments are encompassed within the scope of the present disclosure.

What is claimed is:

1. A display module, comprising:

a backlight structure including a plurality of backlight partitions, a substrate, and a plurality of light-emitting units located on one side of the substrate, wherein:

the display module includes a first display mode and a second display mode;

resolution of the display module in the first display mode is greater than the resolution of the display module in the second display mode;

in the first display mode, a quantity of the plurality of backlight partitions of the backlight structure is n1, and an area of one of the plurality of backlight partitions of the backlight structure is S1;

in the second display mode, the quantity of the plurality of backlight partitions of the backlight structure is n2, and the area of one of the plurality of backlight partitions of the backlight structure is S2, with $n1>n2$, and $S1<S2$, and part of light-emitting units in a backlight partition do not emit light and remaining light-emitting units in the same backlight partition emit light in the second display mode;

the plurality of light-emitting units is arranged in an array along a first direction and a second direction, wherein the first direction and the second direction intersect; and in the second display mode, the light-emitting units used for emitting light and the light-emitting units not used for emitting light are arranged alternately in two adjacent backlight partitions along one of the first direction and the second direction.

2. The display module according to claim 1, wherein:

in the first display mode, a quantity of the light-emitting units in one of the plurality of backlight partitions is N1; and in the second display mode, the quantity of the light-emitting units in one of the plurality of backlight partitions is N2, with $N1<N2$.

3. The display module according to claim 1, wherein:

the backlight structure further includes a plurality of scan lines extending along the first direction and a plurality of data lines extending along the second direction;

the light-emitting units arranged along the first direction are electrically connected to a same scan line, and the light-emitting units arranged along the second direction are electrically connected to a same data line; and the plurality of data lines is used to transmit signals to adjust the quantity of the light-emitting units in each backlight partition in the first display mode and in the second display mode, and/or the plurality of scan lines is used to transmit signals to adjust the quantity of the light-emitting units in each backlight partition in the first display mode and in the second display mode.

4. The display module according to claim 3, wherein:

the plurality of data lines is used to transmit signals to adjust a ratio of the light-emitting units used for emitting light and the light-emitting units not used for emitting light in the backlight partition in the second display mode; and/or the plurality of scan lines is used to transmit signals to adjust the ratio of the light-emitting units used for emitting light and the light-emitting units not used for emitting light in the backlight partition in the second display mode.

5. The display module according to claim 3, wherein:

the backlight structure further includes two or more shift-register groups; and two adjacent scan lines are electrically connected to different shift-register groups respectively.

6. The display module according to claim 2, wherein:

the light-emitting unit includes a mini light-emitting diode (mini-LED).

7. A driving method for a display module, wherein the display module includes a backlight structure including a plurality of backlight partitions, a substrate, and a plurality of light-emitting units located on one side of the substrate, the display module includes a first display mode and a second display mode, and resolution of the display module in the first display mode is greater than the resolution of the display module in the second display mode, comprising:

in the first display mode, adjusting the backlight partitions of the backlight structure, such that a quantity of the backlight partitions of the backlight structure is n1, and an area of one of the backlight partitions of the backlight structure is S1;

in the second display mode, adjusting the backlight partitions of the backlight structure, such that the backlight partitions of the backlight structure is n2, and the area of one of the backlight partitions of the backlight structure is S2, with $n1>n2$, and $S1<S2$, and controlling part of light-emitting units in a backlight partition not to emit light and remaining light-emitting units in the same backlight partition to emit light;

the plurality of light-emitting units is arranged in an array along a first direction and a second direction, wherein the first direction and the second direction intersect; and in the second display mode, the light-emitting units used for emitting light and the light-emitting units not used for emitting light are arranged alternately in two adjacent backlight partitions along one of the first direction and the second direction.

8. The driving method according to claim 7, wherein the method further comprises:

in the first display mode, adjusting the backlight partitions of the backlight structure, such that a quantity of the light-emitting units in one of the plurality of backlight partitions is N1; and in the second display mode, adjusting the backlight partitions of the backlight structure, such that the quantity of the light-emitting units in one of the plurality of backlight partitions is N2, with N1<N2.

9. The driving method according to claim 7, wherein:

the backlight structure further includes a plurality of scan lines extending along the first direction and a plurality of data lines extending along the second direction;

the light-emitting units arranged along the first direction are electrically connected to a same scan line, and the light-emitting units arranged along the second direction are electrically connected to a same data line; and the quantities of the light-emitting units in each backlight partition in the first display mode and in the second display mode are adjusted through signals in the data lines and/or the scan lines.

10. The driving method according to claim 9, wherein:

in the second display mode, a ratio of the light-emitting units used for emitting light and the light-emitting units not used for emitting light in the backlight partitions is adjusted through the signals in the data lines and/or the scan lines.

11. The driving method according to claim 9, wherein:

in the second display mode, among the data lines electrically connected to the light-emitting units in a same backlight partition, two or more of the data lines have a same signal.

12. The driving method according to claim 9, wherein:

the backlight structure further includes two or more shift-register groups; and two adjacent scan lines are electrically connected to different shift-register groups respectively.

13. The driving method according to claim 12, wherein:

in the second display mode, through different shift-register groups of the shift-register groups, scan enable signals are simultaneously provided to two or more scan lines of the scan lines electrically connected to the light-emitting units in a same backlight partition of the backlight partitions.

14. A display device, comprising a display module, wherein:

the display module comprises a backlight structure including a plurality of backlight partitions, a substrate, and a plurality of light-emitting units located on one side of the substrate, wherein:

the display module includes a first display mode and a second display mode;

resolution of the display module in the first display mode is greater than the resolution of the display module in the second display mode;

in the first display mode, a quantity of the plurality of backlight partitions of the backlight structure is n1, and an area of one of the plurality of backlight partitions of the backlight structure is S1;

in the second display mode, the quantity of the plurality of backlight partitions of the backlight structure is n2, and the area of one of the plurality of backlight partitions of the backlight structure is S2, with n1>n2, and S1<S2, and part of light-emitting units in a backlight partition do not emit light and remaining light-emitting units in the same backlight partition emit light in the second display mode;

the plurality of light-emitting units is arranged in an array along a first direction and a second direction, wherein the first direction and the second direction intersect; and in the second display mode, the light-emitting units used for emitting light and the light-emitting units not used for emitting light are arranged alternately in two adjacent backlight partitions along one of the first direction and the second direction.

15. The display module according to claim 1, further comprising a display panel, wherein:

the backlight structure is arranged opposite to the display panel; and the display panel is located on a light-exiting surface of the backlight structure.

16. The display module according to claim 4, wherein:

in the second display mode, in two adjacent backlight partitions along the first direction, the light-emitting units used for emitting light and the light-emitting units not used for emitting light are arranged alternately.

17. The display module according to claim 4, wherein:

in the second display mode, in two adjacent backlight partitions along the second direction, the light-emitting units used for emitting light and the light-emitting units not used for emitting light are arranged alternately.

18. The driving method according to claim 7, wherein:

the display module further includes a display panel;

the backlight structure is arranged opposite to the display panel; and the display panel is located on a light-exiting surface of the backlight structure.

* * * * *